United States Patent
Nomura et al.

(10) Patent No.: US 8,714,940 B2
(45) Date of Patent: May 6, 2014

(54) LIQUID PRESSURE GENERATING APPARATUS AND DRIVING APPARATUS

(75) Inventors: Shinichi Nomura, Anjo (JP); Hiroshi Yoshikawa, Okazaki (JP); Atsushi Mori, Anjo (JP); Hironari Toyoda, Nisshin (JP); Ryo Watanabe, Toyota (JP); Masabumi Nishigaya, Nagoya (JP); Akira Iwano, Fukuroi (JP)

(73) Assignees: Aisin Aw Co., Ltd., Anjo (JP); Toyota Jidosha Kabushiki Kaisha, Toyota (JP); NSK-Warner K. K, Fukuroi-shi (JP)

( * ) Notice: Subject to any disclaimer, the term of this patent is extended or adjusted under 35 U.S.C. 154(b) by 363 days.

(21) Appl. No.: 13/231,380

(22) Filed: Sep. 13, 2011

(65) Prior Publication Data

US 2012/0076675 A1 Mar. 29, 2012

(30) Foreign Application Priority Data

Sep. 24, 2010 (JP) .................. 2010-213946

(51) Int. Cl.
- *F04B 49/00* (2006.01)
- *F16D 41/04* (2006.01)
- *F16D 13/00* (2006.01)

(52) U.S. Cl.
USPC .... 417/223; 417/374; 192/48.92; 192/113.32

(58) Field of Classification Search
USPC ........... 417/223, 374, 319; 192/48.92, 113.32
See application file for complete search history.

(56) References Cited

U.S. PATENT DOCUMENTS

| | | | |
|---|---|---|---|
| 2,741,186 A * | 4/1956 | Nallinger | 417/319 |
| 3,444,748 A * | 5/1969 | Sutaruk | 474/70 |
| 3,539,042 A | 11/1970 | Sacchini | |
| 5,799,744 A | 9/1998 | Yamaguchi et al. | |
| 5,823,282 A | 10/1998 | Yamaguchi | |
| 6,006,881 A * | 12/1999 | Lederman et al. | 192/45.014 |

(Continued)

FOREIGN PATENT DOCUMENTS

| | | |
|---|---|---|
| JP | A-08-197962 | 8/1996 |
| JP | A-09-210187 | 8/1997 |

(Continued)

OTHER PUBLICATIONS

Nov. 22, 2011 (mail date) Search Report issued in International Application No. PCT/JP2011/068957 (w/Translation).

(Continued)

*Primary Examiner* — Charles Freay
(74) *Attorney, Agent, or Firm* — Oliff PLC

(57) ABSTRACT

A liquid pressure generating apparatus including a pump; and two one-way clutches arranged coaxially with the pump's drive shaft. Inner races of the respective two one-way clutches are integrated with each other to form a common inner race. Outer races of the respective two one-way clutches are formed independently from each other and are driven respectively by pump driving members different from each other. The common inner race includes a coupling portion coupled to the pump drive shaft and extending in the radial direction and a cylindrical body portion extending from the coupling portion in a second axial direction opposite from the first axial direction on the radially outside the pump drive shaft. The body portion includes a depression indented radially outward on an inner peripheral surface thereof. A lubricant supply portion for the depression is provided radially inside the depression.

24 Claims, 3 Drawing Sheets

(56) References Cited

U.S. PATENT DOCUMENTS

| | | | |
|---|---|---|---|
| 2002/0148697 A1* | 10/2002 | Muramatsu et al. | 192/46 |
| 2003/0098216 A1* | 5/2003 | Hayashi | 192/48.92 |
| 2008/0080989 A1* | 4/2008 | Bellero et al. | 417/374 |
| 2009/0023529 A1 | 1/2009 | Sanji et al. | |
| 2012/0076675 A1 | 3/2012 | Nomura et al. | |

FOREIGN PATENT DOCUMENTS

| | | |
|---|---|---|
| JP | A-10-067238 | 3/1998 |
| JP | A-2003-336725 | 11/2003 |
| JP | A-2009-023427 | 2/2009 |
| JP | A-2009-101723 | 5/2009 |

OTHER PUBLICATIONS

Nov. 22, 2011 International Search Report issued in PCT/JP2011/068955 (with English-language translation).

Dec. 30, 2013 Office Action issued in co-pending U.S. Appl. No. 13/231,220.

U.S. Appl. No. 13/231,220, filed Sep. 13, 2011.

* cited by examiner

LIQUID PRESSURE GENERATING APPARATUS AND DRIVING APPARATUS

INCORPORATION BY REFERENCE

The disclosure of Japanese Patent Application No. 2010-213946 filed on Sep. 24, 2010, including the specification, drawings and abstract thereof, is incorporated therein by reference in its entirety.

BACKGROUND OF THE INVENTION

1. Field of the Invention

The present invention relates to a liquid pressure generating apparatus including a pump having a pump case and a pump drive shaft, and two one-way clutches arranged coaxially with the pump drive shaft in a line in the axial direction on the side of a first axial direction, which is one side of the pump drive shaft, with respect to the pump case, and a driving apparatus having the corresponding liquid pressure generating apparatus.

2. Description of the Related Art

As an example of a hydraulic pressure generating apparatus in the related art as an example of the above-described liquid pressure generating apparatus, for example, there are hydraulic pressure generating apparatuses described in JP-A-10-67238 and JP-A-2003-336725 described below. More specifically, in both JP-A-10-67238 and JP-A-2003-336725, a configuration in which two one-way clutches are arranged in such a manner that the restricted directions of relative rotation of an outer race with respect to an inner race (hereinafter, referred to as "target direction" in the description of the background art) are identical to each other, and the inner races of both one-way clutches are both coupled to a pump drive shaft is disclosed. Accordingly, when only the outer race of one of the two one-way clutches is rotated in the above-described target direction, an oil pump is driven by the rotation of the corresponding one of the outer races. When the outer races of both of the two one-way clutches rotate in the above-described target direction, the oil pump is driven by the rotation of the outer race rotating at a higher rotational speed from between the corresponding two outer races.

Also, in both JP-A-10-67238 and JP-A-2003-336725, a configuration in which the hydraulic pressure generating apparatus as described above is provided in a driving apparatus for a hybrid vehicle which is capable of traveling using both of an internal combustion engine and a dynamo-electric machine as driving power sources is disclosed. Specifically, a configuration is such that the outer race of one of the one-way clutches and the internal combustion engine are drive-coupled, and the outer race of the other one-way clutch and the dynamo-electric machine are drive-coupled. Accordingly, the oil pump is driven by a torque of the internal combustion engine or the dynamo-electric machine according to the traveling state of the vehicle and so that oil can be supplied to a portion requiring oil adequately.

Incidentally, in a configuration in which the inner races of both of the two one-way clutches are coupled to the pump drive shaft as described above, when the oil pump is driven by the rotation of the outer race of one of the one-way clutches, the outer race of the other one-way clutch is brought into a state of rotating relatively with respect to the inner race in the direction opposite from the target direction. Then, since both of the one-way clutches can be brought into the state in which the outer race rotates relatively with respect to the inner race in the direction opposite from the target direction, it is necessary to supply lubricant to both of the one-way clutches on a sliding surface when the outer race and the inner race rotate relatively with respect to each other. In addition, a mechanism for supplying lubricant to the respective sliding surfaces of the two one-way clutches is preferably simple.

However, in JP-A-10-67238 and JP-A-2003-336725 described above, there is no description about the mechanism for supplying lubricant to the sliding surfaces of the one-way clutches, and a configuration which enables adequate supply of lubricant to the sliding surfaces of both of the two one-way clutches arranged in a line in the axial direction in a simple configuration is not yet known.

SUMMARY OF THE INVENTION

Therefore, realization of a liquid pressure generating apparatus which is capable of supplying lubricant adequately to sliding surfaces of both of two one-way clutches arranged in a line in the axial direction in a simple configuration is desired.

A characteristic configuration of a liquid pressure generating apparatus according to the present invention including a pump having a pump case and a pump drive shaft, and two one-way clutches arranged coaxially with the pump drive shaft in a line in the axial direction on the side of a first axial direction, which is one side of the pump drive shaft, with respect to the pump case is in that inner races of the respective two one-way clutches are integrated with each other and form a common inner race, outer races of the respective two one-way clutches are formed independently from each other and are driven respectively by pump driving members different from each other and, in addition, the restricted directions of relative rotation with respect to the common inner race are identical to each other, the common inner race includes a coupling portion coupled to the pump drive shaft and extending in the radial direction and a cylindrical body portion extending from the coupling portion in a second axial direction opposite from the first axial direction on the radially outside the pump drive shaft, the body portion includes a depression indented radially outward on an inner peripheral surface thereof and a through hole communicating the depression with an outer peripheral surface of the body portion, and a lubricant supply portion for the depression is provided radially inside the depression.

In this characteristic configuration, the lubricant supplied from radially inside to the depression can be collected efficiently and the lubricant collected in the corresponding depression can be supplied to the outer peripheral surface of the body portion via the through hole using centrifugal force. In other words, the lubricant can be supplied from radially inside the common inner race efficiently and the corresponding lubricant can be guided to the outer peripheral surface of the body portion provided on the common inner race. Then, since the respective outer races of the two one-way clutches are arranged radially outside the outer peripheral surface of the body portion, the configuration for supplying the lubricant guided to the outer peripheral surface of the body portion to the respective sliding surfaces of both of the one-way clutches can be simplified. Also, since the supply portion of the lubricant to the depression is provided radially inside the corresponding depression, adequate supply of the lubricant to the depression is achieved in a simple configuration using centrifugal force or the like.

As described above, according to this characteristic configuration, lubricant can be supplied adequately to sliding surfaces of both of two one-way clutches arranged in a line in the axial direction in a simple configuration.

It is here preferable to configure in such a manner that a supporting portion for supporting the common inner race from the side of the first axial direction is further provided, the pump case includes a projecting portion projecting from the corresponding pump case in the first axial direction, and radially supporting the corresponding pump drive shaft from radially outside the pump drive shaft so as to be capable of rotating relatively with respect to each other, a distal end portion of the projecting portion in the axial direction is arranged radially inside the body portion at a position overlapping with the depression or a position on the side of the first axial direction with respect to the depression when viewed in the radial direction, the pump drive shaft includes a surface extending in the direction intersecting the axial direction, and is provided with a pressure receiving portion configured to receive a liquid pressure in the first axial direction at the time when the oil pump is driven, and a gap allowing lubricant to flow in the radial direction of the pump drive shaft is formed between the distal end portion of the projecting portion and the connecting portion in a state in which the common inner face receives a pressure by the pressure receiving portion and is supported from the side of the first axial direction by the supporting portion.

In this configuration, the pump drive shaft can be axially supported from the side of the second axial direction using the liquid pressure generated when the pump is driven, and the pump drive shaft can be axially supported from the side of the first axial direction by a resistance force according to the magnitude of the above-described liquid pressure that the common inner race receives from the supporting portion. In other words, the pump drive shaft can be axially supported from both sides adequately in the axial direction. Then, both of the pump drive shaft and the common inner race connected thereto can be positioned adequately in the axial direction.

Then, since the gap which allows the lubricant to flow radially of the pump drive shaft is formed between the distal end portion of the projecting portion and the coupling portion in a state in which the common inner race receives a pressure on the pressure receiving portion and is supported by the supporting portion from the side of the first axial direction, supply of the lubricant to the depression via the corresponding gap is ensured at the time when the pump is driven which may bring about a state in which the outer race of at least any one of the one-way clutches rotates relatively with respect to the common inner race.

Furthermore, since the pump drive shaft is radially supported by the projecting portion of the pump case, the pump drive shaft can be radially supported over a wide area in the axial direction. Therefore, as a configuration in which the pump drive shaft is radially supported on one side in the axial direction, enhancement of supporting accuracy of the pump drive shaft is enabled. Then, the distal end portion of the projecting portion in the axial direction is arranged radially inside the body portion at a position overlapping with the depression or a position on the side of the first axial direction with respect to the corresponding depression when viewed in the radial direction. In other words, the body portion of the common inner race is arranged on the radially outside the projecting portion so as to have a portion located at the same axial position as the corresponding projecting portion. Therefore, in comparison with the case where the two one-way clutches and the projecting portion for supporting the pump shaft are arranged in a line in the axial direction, an axial space required for arranging the two one-way clutches and the pump can be reduced. In other words, in this configuration, the projecting portion can be provided in the pump case, while restraining upsizing of the liquid pressure generating apparatus in the axial direction, so that the supporting accuracy of the pump drive shaft can be secured.

It is also preferably to configure in such a manner that the respective two one-way clutches include a drive power transmitting member configured to transmit a driving power selectively between the outer race and the inner race, the drive power transmitting member of the first one-way clutch, which is one of the two one-way clutches, is arranged in a first accommodating chamber provided in the common inner race, and the drive power transmitting member of the second one-way clutch, which is the other one of those, is arranged in a second accommodating chamber provided in the common inner race, and the common inner race includes a first communicating channel configured to communicate an opening of the through hole on the outer peripheral surface of the body portion with the first accommodating chamber, and a second communicating channel configured to communicate the opening of the through hole on the outer peripheral surface of the body portion with the second accommodating chamber.

Since the driving power transmitting member can come into abutment with both of the outer race and the inner race, the accommodating chamber for such a driving power transmitting member defines a space surrounded by an outer peripheral surface of the inner race and the inner peripheral surface of the outer race. In this configuration, a configuration in which the lubricant introduced onto the outer peripheral surface of the body portion is supplied to the inner peripheral surface of the outer race via the corresponding accommodating chamber, thereby supplying the lubricant to the sliding surface of the one-way clutch can easily be achieved using such the accommodating chamber.

In the configuration such that the common inner race includes the first communicating channel and the second communicating channel as described above, it is here preferably to configure in such a manner that the body portion includes a cylindrical body portion outer peripheral surface, the first accommodating chamber and the second accommodating chamber communicate with a common through hole as the through hole common to each other, a common opening as an opening of the common through hole on the body portion outer peripheral surface is formed between the first accommodating chamber and the second accommodating chamber in the axial direction, and the first communicating channel and the second communicating channel are formed so as to extend from the common opening to the opposite sides from each other in the axial direction.

In this configuration, in comparison with a case where a thorough hole for supplying lubricant to the first accommodating chamber and a through hole for supplying lubricant to the second accommodating chamber are provided separately, the number of through holes to be formed on the body portion can be reduced, so that both of reduction of manufacturing cost and securement of the strength of the body portion can be achieved.

Also, since the common opening is formed between the first accommodating chamber and the second accommodating chamber in the axial direction, and the first communicating channel and the second communicating channel are formed so as to extend from the common opening to directions opposite from each other in the axial direction, the lengths of the first communicating channel and the second communicating channel can be reduced, and adequate supply of the lubricant from the common opening to both of the first communicating channel and the second communicating channel is easily achieved.

Also, in the liquid pressure generating apparatus having the respective configurations as described above, it is preferable that the pump case includes a pump case inner flow channel communicating with a discharge port of the pump, the pump drive shaft includes a first flow channel communicating with the pump case inner flow channel via a passing portion and extending in the axial direction and a second flow channel communicating with the first flow channel, extending in the radial direction, opening through the outer peripheral surface of the corresponding pump drive shaft, and forming the supply portion, and the pump case inner flow channel, the passing portion, the first flow channel, and the second flow channel form a flow channel for supplying lubricant discharged from the pump to the depression.

In this configuration, since the flow channel formed in the pump driving shaft which is rotated at the time when the pump is driven is included in the flow channel for supplying the lubricant discharged from the pump to the depression, centrifugal force generated in association with the rotation of the pump drive shaft can be utilized as an energy source required for supplying the lubricant to the depression and supplying the lubricant collected in the corresponding depression radially outward via the through hole. Therefore, the lubricant discharged from the pump can be supplied to the sliding surface of the one-way clutch in a simple configuration.

Here, in a configuration in which the pump case inner flow channel, the passing portion, the first flow channel, and the second flow channel form a flow channel for supplying the lubricant discharged from the pump to the depression as described above, it is preferable that the supporting portion configured to support the common inner race from the side of the first axial direction and a thrust bearing arranged between the common inner race and the supporting portion for receiving an axial load is provided, the pump drive shaft further includes a third flow channel on the side of the first axial direction with respect to the second flow channel, the third flow channel communicating with the first flow channel, extending in the radial direction, and opening through the outer peripheral surface of the corresponding pump drive shaft and radially inside the thrust bearing, and the pump case inner flow channel, the passing portion, the first flow channel, and the third flow channel form a flow channel for supplying lubricant discharged from the pump to the thrust baring.

In this configuration, the flow channel for supplying the lubricant discharged from the pump to the thrust bearing which supports the common inner race from the side of the first axial direction can be formed using part of the flow channel for supplying the lubricant discharged from the pump to the depression, so that the flow channel of the lubricant to be formed in the liquid pressure generating apparatus can be simplified.

A first characteristic configuration of a driving apparatus according to the present invention is in that the liquid pressure generating apparatus as described above; a first pump driving member drive-coupled to a driving power source; a second pump driving member drive-coupled to a wheel; and a drive transmission device configured to transmit a driving power selectively between the first pump driving member and the second pump driving member are provided, an outer race of the first one-way clutch, which is one of the two one-way clutches, is driven by the first pump driving member, and an outer race of the second one-way clutch, which is the other one of those, is driven by the second pump driving member.

In this application, the term "drive-coupling" means that a state in which two rotating elements are coupled so as to be capable of transmitting a driving power, and is used as a concept including a state in which the corresponding two rotating elements are coupled so as to be rotated integrally with each other, or a state in which the corresponding two rotating elements are coupled so as to be capable of transmitting a driving power via one or two or more transmitting members. Such the transmitting member includes various members which transmit rotation at the same speed or after changing the speed and, for example, includes a shaft, a gear mechanism, a belt, a chain, and so on. Also, such the transmitting member may include an engaging element which selectively transmits the rotation and the driving power, for example, a frictional clutch, a claw clutch, or the like.

Also, in this application, the term "driving power source" means various types of power source which can generate a driving power, for example, a dynamo-electric machine, an internal combustion engine, or a combination thereof, and preferably the one which can become a driving power source of the vehicle.

According to the first characteristic configuration as described above, as long as at least any one of the output revolving shaft as the driving power source and the wheel is rotating, the pump can be driven to generate a liquid pressure. For example, in a case where the liquid pressure generating apparatus is a hydraulic pressure generating apparatus which generates a hydraulic pressure, oil can be supplied to portions in the driving apparatus which require oil easily in various traveling states of the vehicle such as a state in which the wheel is stopped and the driving power source is in operation, or a state in which the wheel is rotated and the driving power source is stopped.

A second characteristic configuration of a driving apparatus according to the present invention is in that the liquid pressure generating apparatus as described above; a first pump driving member drive-coupled to a first driving power source; a second pump driving member drive-coupled to a second driving power source; and a drive transmission device configured to transmit a driving power selectively between the first pump driving member and the second pump driving member are provided, an outer race of the first one-way clutch, which is one of the two one-way clutches, is driven by the first pump driving member, and an outer race of the second one-way clutch, which is the other one of those, is driven by the second pump driving member.

According to the second characteristic configuration as described above, as long as at least any one of the output revolving shaft of the first driving power source and the output revolving shaft of the second driving power source is rotating, the pump can be driven to generate a liquid pressure. For example, in a case where the liquid pressure generating apparatus is a hydraulic pressure generating apparatus which generates a hydraulic pressure, oil can be supplied to portions in the driving apparatus which require oil easily in various traveling states of the vehicle such as a state in which the first driving power source is in operation and the second driving power source is stopped, or a state in which the first driving power source is stopped and the second driving power source is in operation.

Here, in the driving apparatus having the above-described first characteristic configuration or the above-described second characteristic configuration, it is preferable that a first dynamo-electric machine and a second dynamo-electric machine as driving power sources are provided, the drive transmission device includes a differential gear mechanism having at least three rotating elements including a first rotating element, a second rotating element, and a third rotating element, the first dynamo-electric machine is drive-coupled to the first rotating element, an internal combustion engine is drive-coupled to the second rotating element, the second dynamo-electric machine and a wheel are drive-coupled to the third rotating element, and the first pump driving member is driven by the internal combustion engine, the second pump driving member is driven by the wheel or the second dynamo-electric machine.

In this application, the term "dynamo-electric machine" is used as a concept including all of a motor (electric motor), a generator (power generator), and a motor-generator which functions as needed both as the motor and the generator.

Also, in a case of expressing the respective rotating elements of the differential gear mechanism as "drive-coupled" as described above, it means a state in which three or more rotating elements provided in the corresponding differential gear mechanism are drive-coupled without the intermediary of other rotating element.

In this configuration, a hybrid driving apparatus of so-called a two-motor split type can be adequately realized. Then, in the hybrid driving apparatus of the two-motor split type, the pump can be driven to generate the liquid pressure as long as any one of the output revolving shaft of the internal combustion engine and the revolving shaft of the second dynamo-electric machine or the wheel is rotated.

DETAILED DESCRIPTION OF THE EMBODIMENTS

Figure 1:
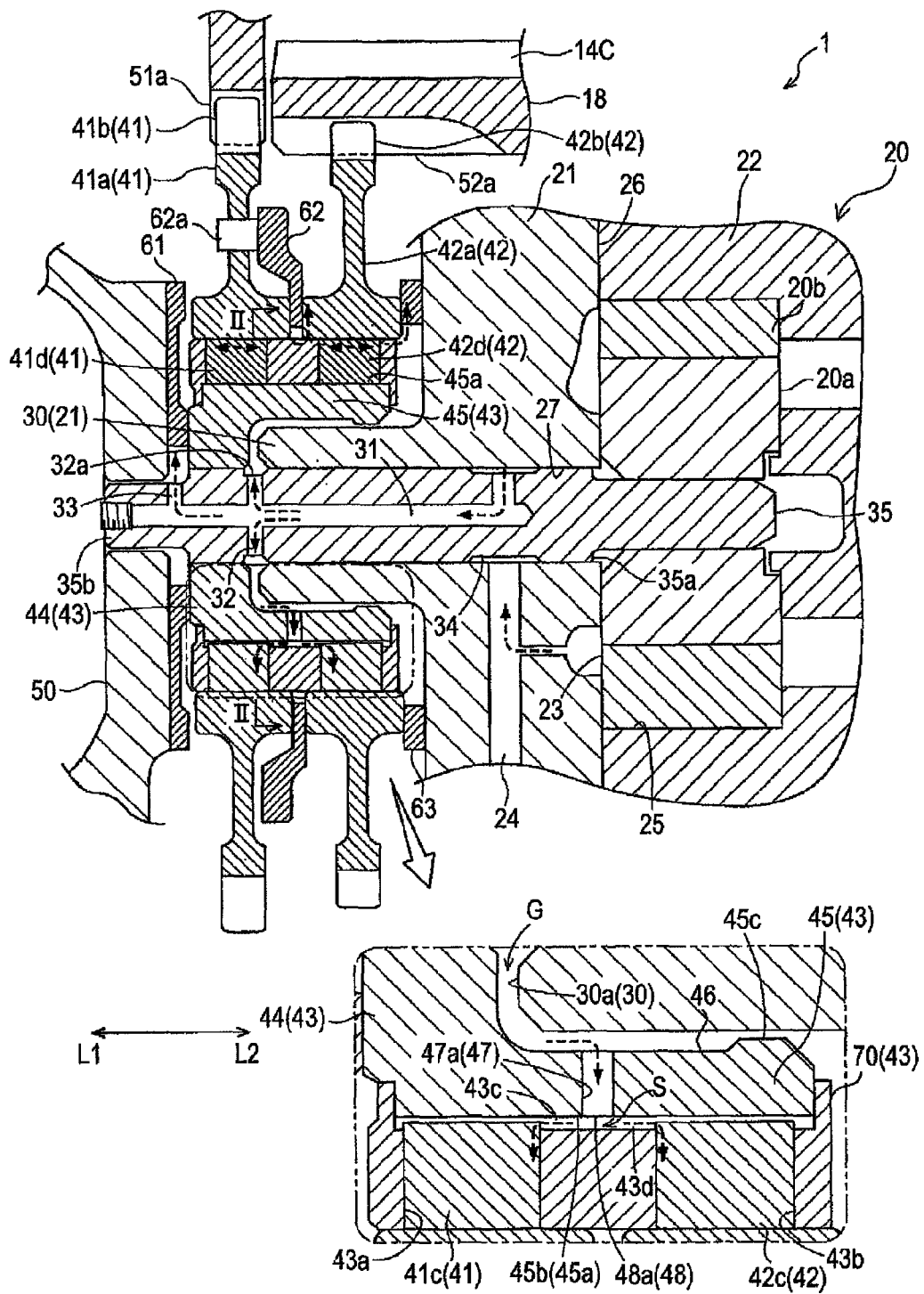
FIG. 1 is a cross-sectional view of a hydraulic pressure generating apparatus according to an embodiment of the present invention taken along the axial direction and a partly enlarged view thereof.

Referring to the drawings, embodiments of a liquid pressure generating apparatus and a driving device according to the present invention will be described. Here, a case where the liquid pressure generating apparatus according to the present invention is applied to a hydraulic pressure generating apparatus configured to generate a hydraulic pressure, and the driving apparatus according to the present invention is a vehicle driving apparatus provided with the corresponding hydraulic pressure generating apparatus will be described as an example. A hydraulic pressure generating apparatus 1 according to this embodiment includes a common inner race formed by integrating respective inner races of two one-way clutches 41, 42 with respect to each other as shown in FIG. 1. Then, it is characterized in that the common inner race 43 includes a coupling portion 44 and a body portion 45, and the body portion 45 includes a reservoir depression 46 and a through hole 47, and an oil supply portion 32a is provided radially inside the reservoir depression 46. Accordingly, oil can be supplied adequately to sliding surfaces of both of two one-way clutches 41, 42 arranged in a line in the axial direction in a simple configuration. Hereinafter, configurations of the hydraulic pressure generating apparatus 1 and a vehicle driving apparatus 2 according to this embodiment will be described in detail. In this embodiment, the hydraulic pressure generating apparatus 1 and the vehicle driving apparatus 2 correspond respectively to a "liquid pressure generating apparatus" and a "driving apparatus" in the present invention.

In the following description, "axial direction", "circumferential direction", and "radial direction" are defined with reference to an axial center of a pump drive shaft 35 unless otherwise specified. Also, in the following description, the term "first axial direction L1" represents leftward along the axial direction in FIG. 1, and the term "second axial direction L2" represents rightward along the axial direction in FIG. 1. The term "first circumferential direction C1" represents counterclockwise direction in FIG. 2, and "second circumferential direction C2" represents clockwise direction in FIG. 2.

Also, in the following description, in a case where the first one-way clutch 41 and the second one-way clutch do not necessarily have to be distinguished, these members are collectively referred to as the one-way clutches 41, 42. In a case where a first dynamo-electric machine 11 and a second dynamo-electric machine 12 do not have to be distinguished, these members are collectively referred to as the dynamo-electric machines 11, 12. In a case where a first outer race 41a and a second outer race 42a do not necessarily have to be distinguished, these members are collectively referred to as the outer races 41a, 42a. In a case where a first driving power transmitting member 41c and a second driving power transmitting member 42c do not necessarily have to be distinguished, these members are collectively referred to as the driving power transmitting members 41c, 42c. In a case where a first block bearing 41d and a second block bearing 42d do not necessarily have to be distinguished, these members are collectively referred to as the block bearings 41d, 42d.

1. Configuration of Hydraulic Pressure Generating Apparatus

Figure 2:
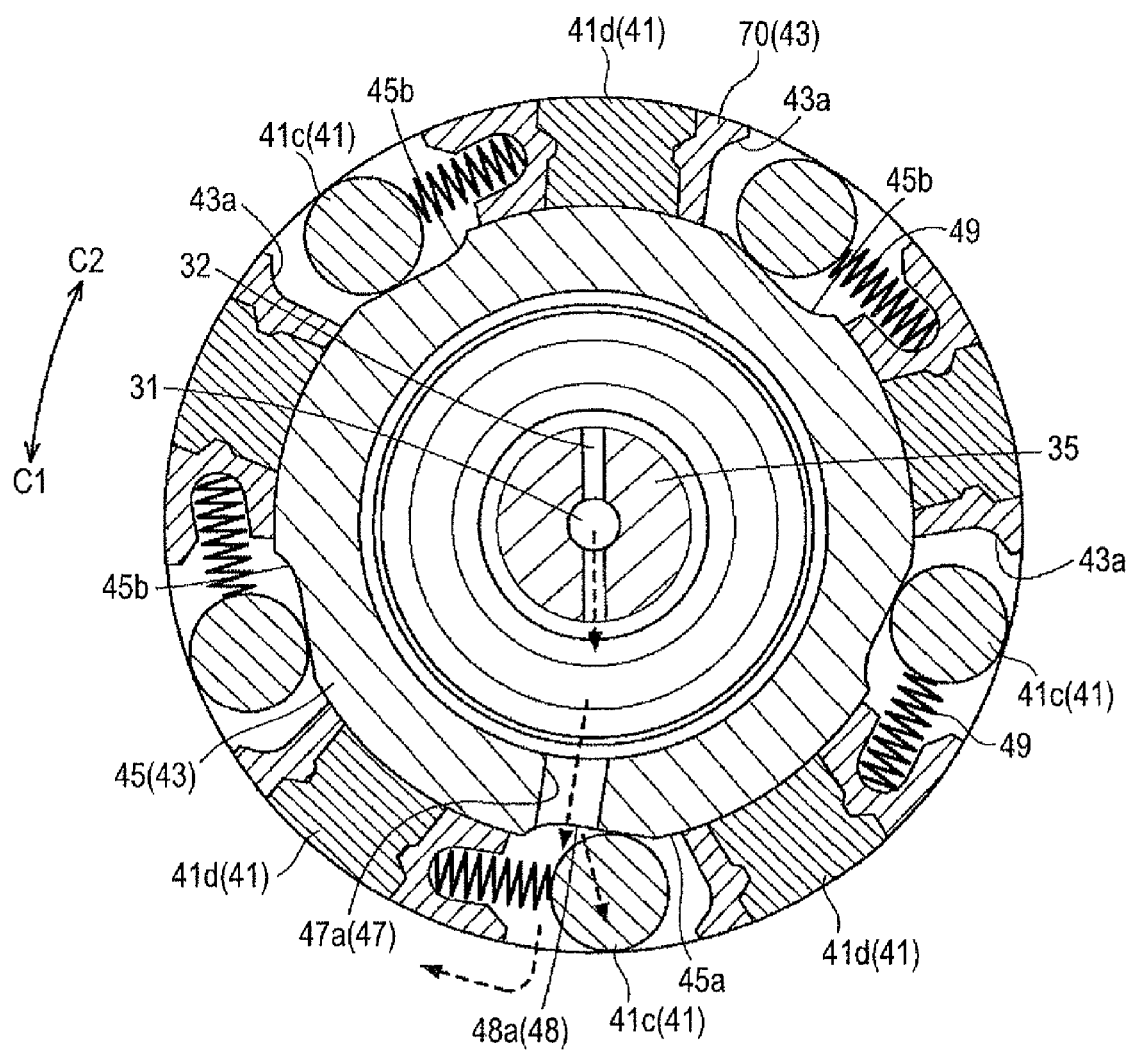
FIG. 2 is a cross-sectional view taken along the line IT-II in FIG. 1.

A configuration of the hydraulic pressure generating apparatus 1 according to this embodiment will be described with reference to FIG. 1 and FIG. 2. For reference sake, although FIG. 2 is a cross-sectional view taken along the line II-II in FIG. 1, in order to facilitate understanding of the invention, the body portion 45 described later is illustrated in section at an axial position where the through hole 47 is formed. As shown in FIG. 1, the hydraulic pressure generating apparatus 1 includes an oil pump 20, and two one-way clutches 41, 42. Then, the hydraulic pressure generating apparatus 1 intakes oil (an example of the lubricant, which corresponds to "lubricant" in the present invention) from an oil pan, not shown, by driving the oil pump 20 and generates a hydraulic pressure, and supplies oil to positions requiring oil for lubrication, cooling, and the like. In this embodiment, the oil pump 20 corresponds to a "pump" in the present invention.

The oil pump 20 includes a pump cover 21, a pump body 22, the pump drive shaft 35, and a pump rotor (an inner rotor 20a and an outer rotor 20b). The pump body 22 includes a pump chamber forming depression 25 having a circular shape in cross section viewed in the axial direction. The pump cover 21 includes a wall surface 26 configured to close an opening of the pump chamber forming depression 25 formed in the pump body 22 on the side of the first axial direction L1, and an insertion hole 27 of the pump drive shaft 35. Then, the wall surface 26 closes the opening of the pump chamber forming depression 25 on the side of the first axial direction L1 in a state in which the pump body 22 and the pump cover 21 are joined to each other, and a pump chamber for accommodating the pump rotor is formed by the pump chamber forming depression 25 and the wall surface 26. In this embodiment, the pump cover 21 and the pump body 22 joined to each other constitute a "pump case" in the present invention. For reference sake, the pump case (the pump cover 21 and the pump body 22) is formed integrally with a case provided in the hydraulic pressure generating apparatus 1 (the driving apparatus case, described later, in this example), or fixed to the corresponding case directly or via a separate member.

In this embodiment, the oil pump 20 is an internal gear pump. Then, the inner rotor 20a and the outer rotor 20b which constitute the pump rotor are accommodated in the above-described pump chamber defined by the pump chamber forming depression 25 and the wall surface 26. The inner rotor 20a is drive-coupled to the pump drive shaft 35 so as to be rotated integrally, and the oil pump 20 is driven by the rotation of the pump drive shaft 35. For reference sake, the configuration of the oil pump 20 is not limited thereto, and an external gear pump, a vane pump, and the like are also preferable as the type of the pump.

The pump drive shaft 35 is a shaft for driving the oil pump 20. The pump drive shaft 35 is arranged radially inside the insertion hole 27 formed in the pump case (the pump cover 21 in this example) so as to be rotatable relatively with respect to the corresponding pump case. Although detailed description will be given later, a shaft center oil channel (a first flow channel 31 described later) is formed in the interior of the pump drive shaft 35, and oil discharged from the oil pump 20 is supplied to the one-way clutches 41, 42 via the shaft center oil channel, whereby lubrication of the one-way clutches 41, 42 is performed.

As shown in FIG. 1, the pump drive shaft 35 is radially supported by the pump case (the pump cover 21 in this example). More specifically, the pump cover 21 includes a projecting portion 30 projecting from the corresponding pump cover 21 in the first axial direction. L1, and radially supporting the corresponding pump drive shaft 35 from radially outside the pump drive shaft 35 so as to be capable of rotating relatively with respect to each other. Then, the pump drive shaft 35 is radially supported by the pump cover 21 provided with the projecting portion 30 in a wide area in the axial direction. In this embodiment, the projecting portion 30 is formed into a cylindrical shape coaxially with the pump drive shaft 35.

Then, with the radial support of the pump drive shaft 35 by the pump case over the wide area in the axial direction as described above, a configuration in which the pump drive shaft 35 is supported on one side in the axial direction is realized. More specifically, the pump drive shaft 35 is radially supported only by the pump case (the pump cover 21 in this example). Accordingly, in comparison with a configuration in which the pump drive shaft 35 is radially supported on both sides in the axial direction, enhancement of supporting accuracy of the pump drive shaft 35 is enabled.

As a postscript, if a clearance to be set to a member which radially supports the pump drive shaft 35 is large, the degree of inclination to which the pump drive shaft 35 can be inclined with respect to the axial direction or the degree of displacement to which the same can be moved in the radial direction are apt to be large. Then, in the configuration in which the pump drive shaft 35 is radially supported on both sides in the axial direction, a large clearance considering assemble accuracy of the both supporting members on both sides in the axial direction is required. In contrast, in this embodiment, by employing the configuration in which the pump drive shaft 35 is axially supported on one side, the clearance provided in the pump cover 21 as the member for radially supporting the pump drive shaft 35 can be reduced. Then, as described above, the pump drive shaft 35 is radially supported by the pump case in a wide area in the axial direction. Therefore, in this embodiment, the degree of inclination to which the pump drive shaft 35 can be inclined with respect to the axial direction or the degree of displacement to which the same can be moved in the radial direction can be suppressed to be small, so that the supporting accuracy of the pump drive shaft 35 can be enhanced as a result.

The one-way clutches 41, 42 are arranged in a line in the axial direction coaxially with the pump drive shaft 35 on the side of the first axial direction L1 with respect to the pump cover 21 and the pump body 22. More specifically, the first one-way clutch 41 and the second one-way clutch 42 are arranged from the side of the first axial direction L1 toward the side of the second axial direction L2 in this order.

The first one-way clutch 41 and the second one-way clutch 42 include the common inner race 43 formed by integrating the respective inner races thereof with respect to each other. Then, the first one-way clutch 41 includes the outer race 41a arranged coaxially with the common inner race 43, the first driving power transmitting member 41c configured to selectively transmit torque (driving power) between the common inner race 43 and the outer race 41a, and the block bearing 41d configured to retain a distance between the common inner race 43 and the outer race 41a. Also, the second one-way clutch 42 includes the outer race 42a arranged coaxially with the common inner race 43, the driving power transmitting member 42c configured to selectively transmit torque (driving power) between the common inner race 43 and the outer race 42a, and the block bearing 42d configured to retain a distance between the common inner race 43 and the outer race 42a.

In the following description, the outer race 41a, the driving power transmitting member 41c, and the block bearing 41d provided in the first one-way clutch 41 are referred to as "first outer race 41a", "first driving power transmitting member 41c", and "first block bearing 41d", respectively. Also, the outer race 42a, the driving power transmitting member 42c, and the block bearing 42d provided in the second one-way clutch 42 are referred to as "second outer race 42a", "second driving power transmitting member 42c", and "second block bearing 42d", respectively.

The common inner race 43 includes the coupling portion 44, the body portion 45, and a retainer (cage) 70. The coupling portion 44 is a portion to be connected (drive-connected) to the pump drive shaft 35 on the side of the first axial direction L1 with respect to the projecting portion 30, and is formed so as to extend in the radial direction. For reference sake, the coupling portion 44 is fixed to the pump drive shaft 35 in a state in which the axial and circumferential relative movements with respect to the pump drive shaft 35 are restricted, and rotates integrally with the pump drive shaft 35. The coupling portion 44 is fixed to the pump drive shaft 35 by, for example, welding or the like.

The body portion 45 is formed so as to extend from the coupling portion 44 in the second axial direction L2 on the radially outside the pump drive shaft 35. More specifically, the body portion 45 extends from the coupling portion 44 in the second axial direction L2, and is arranged on the radially outside the projecting portion so as to have a portion located at the same axial position as the corresponding projecting portion 30. In other words, the body portion 45 is arranged so as to have a portion overlapped with the projecting portion 30 when viewed in the radial direction. Then, in this embodiment, the body portion 45 is formed into a tubular shape (more specifically, a cylindrical shape) coaxial with the pump drive shaft 35, and is arranged so that a portion of the body portion 45 on the side of the second axial direction L2 covers a portion of the projecting portion 30 on the side of the first axial direction L1 from the radially outside thereof. For reference sake, in this specification, the expression "having an overlapped portion when viewed in a certain direction" relating to the arrangement of two members means that in a case where a view point is moved in respective directions orthogonal to the corresponding direction of visual line, assuming that the corresponding direction is the direction of visual line, a view point from which the two members appear to be overlapped exists in at least a certain area.

As described above, by arranging the body portion 45 so as to have the overlapped portion with the projecting portion 30 when viewed in the radial direction, the projecting portion 30 can be provided in the pump case (the pump cover 21 in this example) while restraining upsizing of the hydraulic pressure generating apparatus 1 in the axial direction, so that the supporting accuracy of the pump drive shaft 35 can be secured. For reference sake, in this embodiment, by forming the inner race of the first one-way clutch 41 and the inner race of the second one-way clutch 42 integrally, a space extending in the axial direction is formed between the common inner race 43 and the pump drive shaft 35 as shown in FIG. 1, so that a configuration of arranging the projecting portion 30 in the corresponding space is realized.

Incidentally, as described later, when driving the oil pump 20, oil is supplied to the body portion 45 from radially inside. Then, the body portion 45 includes the reservoir depression 46 and the through hole 47 for introducing oil supplied from radially inside into the interiors of the one-way clutches 41, 42 efficiently as indicated by an enlarged drawing in FIG. 1. The reservoir depression 46 is a depression formed on an inner peripheral surface of the body portion 45 so as to be indented radially outward, and is partitioned by a dam portion 45c on the side of the second axial direction L2. By the provision of the reservoir depression 46 as described above, oil supplied from the radially inside at the time when the oil pump 20 is driven is prevented by the dam portion 45c from flowing radially outward via a gap between the body portion 45 and the pump case 21 located on the side of the second axial direction L2 of the body portion 45, so that the oil can be collected effectively in the reservoir depression 46. Incidentally, in this embodiment, the reservoir depression 46 is formed over the entire area in the circumferential direction. An end portion of the reservoir depression 46 on the side of the first axial direction L1 is at the same axial position as an end portion of the coupling portion 44 on the side of the second axial direction L2. In this embodiment, the reservoir depression 46 corresponds to a "depression" in the present invention.

The through hole 47 is formed so as to communicate the reservoir depression 46 and a body portion outer peripheral surface 45a, which is an outer peripheral surface of the body portion 45, as shown in FIG. 1 and FIG. 2. Then, with the provision of the through hole 47 in this manner, a large part of the oil supplied from radially inside at the time when the oil pump 20 is driven flows into the through hole 47 via the reservoir depression 46 by a centrifugal force, and reaches an opening 48 of the through hole 47 on the body portion outer peripheral surface 45a. For reference sake, in this example, as shown in FIG. 1, the through hole 47 is formed so as to extend in a direction orthogonal to the axial direction. Also, as shown in FIG. 2, the through hole 47 is formed so as to extend in the direction substantially parallel to the radial direction, more specifically, so as to be directed slightly in the second circumferential direction C2 as it goes from radially inside to radially outside. Detailed description about the flow of oil will be described later.

The retainer 70 includes accommodating chambers for accommodating the drive power transmitting members 41c, 42c, the block bearings 41d, 42d, and urging members 49 (see FIG. 2). The retainer 70 is fixed radially outside the body portion 45, and is rotated integrally with the body portion 45. The retainer 70 is formed of, for example, metal, synthetic resin, or the like.

In this embodiment, both of the first one-way clutch 41 and the second one-way clutch 42 are roller-type one-way clutches. Therefore, both of the first driving power transmitting members 41c and the second driving power transmitting members 42c are column-shaped members having axes arranged in parallel to the axial direction, as shown in FIG. 1 and FIG. 2. Then, the drive power transmitting members 41c, 42c and the block bearings 41d, 42d are arranged in the accommodating chambers formed in the retainer 70. For reference sake, in this example, the accommodating chambers formed in the retainer 70 have openings on both sides in the radial direction, and the radially inside opening is closed by the body portion outer peripheral surface 45a of the body portion 45. Also, the radially outside openings of the accommodating chambers formed in the retainer 70 are substantially closed by inner peripheral surfaces of the outer races 41a, 42a.

More specifically, as shown in FIG. 2, the retainer includes first accommodating chambers 43a, which are accommodating chambers for accommodating the first driving power transmitting members 41c and accommodating chambers for accommodating the first block bearings 41d alternately along the circumferential direction. In the example shown in FIG. 2, the retainer 70 includes five each of accommodating chambers for accommodating the first accommodating chambers 43a and the first block bearings 41d.

Then, in each of the first accommodating chambers 43a, an urging member 49 configured to urge the first driving power transmitting member 41c in the first circumferential direction C1 (for example, a resilient member such as a spring) is arranged. Also, on the body portion outer peripheral surface 45a which defines radially inside boundaries of the respective first accommodating chambers 43a is formed with outer peripheral depressions 45b indented radially inward. The outer peripheral depressions 45b each has an inclined surface which is directed radially outward as it goes in the first circumferential direction C1. Therefore, in this example, the relative rotation of the first outer race 41a with respect to the common inner race 43 in the first circumferential direction C1 is restricted, and the relative rotation of the first outer race 41a with respect to the common inner race 43 in the second circumferential direction C2 is allowed.

In the same manner, the retainer 70 includes second accommodating chambers 43b (see FIG. 1) as accommodating chambers for accommodating the second driving power transmitting members 42c, and accommodating chambers for accommodating the second block bearings 42d alternately along the circumferential direction. Although the illustration is omitted, the second accommodating chambers 43b are arranged in the same manner as the first accommodating chambers 43a described with reference to FIG. 2 above, and the urging members 49 and the outer peripheral depressions 45b are also provided in the same manner. Therefore, the relative rotation of the second outer race 42a with respect to the common inner race 43 in the first circumferential direction C1 is restricted, and the relative rotation of the second outer race 42a with respect to the common inner race 43 in the second circumferential direction C2 is allowed. In this manner, the restricted directions of relative rotation with respect to the common inner race 43 of the respective outer races 41a, 42a of the two one-way clutches 41, 42 are identical to each other (the first circumferential direction C1 in this example).

Although the illustration is omitted as well, the accommodating chambers for accommodating the second block bearings 42d are arranged in the same manner as the accommodating chambers for accommodating the first block bearings 41d described with reference to FIG. 2 above. In other words, in this example, the retainer 70 includes five each of accommodating chambers for accommodating the second accommodating chambers 43b and the second block bearings 42d.

Then, in this embodiment, as shown in FIG. 1, the first accommodating chambers 43a for accommodating the first driving power transmitting members 41c and the second accommodating chambers 43b for accommodating the second driving power transmitting members 42c are formed at the same circumferential positions. Also, the accommodating chambers for accommodating the first block bearings 41d and the accommodating chambers for accommodating the second block bearings 42d are formed at the same circumferential positions.

For reference sake, when the first outer race 41a rotates relatively with respect to the common inner race in the second circumferential direction C2, radially outside surfaces of the first block bearings 41d correspond to sliding surfaces with respect to an inner peripheral surface of the first outer race 41a. Also, when the second outer race 42a rotates relatively with respect to the common inner race 43 in the second circumferential direction C2, radially outside surfaces of the second block bearings 42d correspond to sliding surfaces with respect to an inner peripheral surface of the second outer race 42a. Then, in this embodiment, as described later, a configuration in which oil is supplied by the hydraulic pressure generated by the oil pump 20 is supplied to these sliding surfaces is provided. For reference sake, the block bearings 41d, 42d are formed of, for example, oil retaining sintered alloy or the like.

The respective outer races 41a, 42a of the two one-way clutches 41, 42 are formed independently from each other, and are driven respectively by pump driving members different from each other. More specifically, as shown in FIG. 1, the outer race (first outer race) 41a of the first one-way clutch 41 and the outer race (second outer race) 42a of the second one-way clutch 42 are formed independently from each other. Then, on an outer peripheral surface of the first outer race 41a, a first driven gear 41b which engages a first driving gear 51a is formed, and the first outer race 41a of the first one-way clutch 41 is driven by the first driving gear 51a. Also, on an outer peripheral surface of the second outer race 42a, a second driven gear 42b which engages a second driving gear 52a is formed, and the outer race 42a of the second one-way clutch 42 is driven by the second driving gear 52a. For reference sake, as described later, the first driving gear 51a is drive-coupled with the first pump driving member 51 (see FIG. 3), and the second driving gear 52a is drive-coupled to the second pump driving member 52 (see FIG. 3). In this embodiment, the first driven gear 41b and the second driven gear 42b correspond to a "first gear" and a "second gear" in the present invention, respectively.

For reference sake, in this embodiment, as shown in FIG. 1, the first driven gear 41b arranged on the side of the first axial direction L1 with respect to the second driven gear 42b is arranged so as to have a portion located at the same axial position as the coupling portion 44. The first outer race 41a, the first driving power transmitting members 41c, and the first block bearings 41d are also arranged so as to have a portion located at the same axial position as the coupling portion 44. For reference sake, it is also possible to arrange at least any one of the first driven gear 41b, the first outer race 41a, the first driving power transmitting members 41c, and the first block bearings 41d shifted in the axial direction with respect to the coupling portion 44 so as not to have a portion located at the same axial position as the coupling portion 44.

As described above, the first outer race 41a of the first one-way clutch 41 is restricted from rotating relatively with respect to the common inner race 43 in the first circumferential direction C1, and the second outer race 42a of the second one-way clutch 42 is also restricted from rotating relatively with respect to the common inner race 43 in the first circumferential direction C1. Therefore, in a case where only one outer race of the first outer race 41a and the second outer race 42a is rotating in the first circumferential direction C1, the oil pump 20 is driven by the rotation of the corresponding one of the outer races. Also, in a case where only both of the outer races; the first outer race 41a and the second outer race 42a rotate in the first circumferential direction C1, the oil pump 20 is driven by the rotation of the outer race rotating at a higher rotational speed from between both of the corresponding outer races.

In this embodiment, the inner diameter of the outer races 41a, 42a of the respective two one-way clutches 41, are identical to each other. Also, since the body portion 45 provided in the common inner race 43 is formed into a cylindrical shape in this embodiment, the body portion outer peripheral surface 45a has a cylindrical shape. In other words, as shown in FIG. 1, the body portion 45 is formed to have a uniform outer peripheral surface in the axial direction. Therefore, the drive power transmitting members 41c, 42c, the block bearings 41d, 42d, and the urging members 49 may be used respectively as common components between the first one-way clutch 41 and the second one-way clutch 42, so that the reduction of the number of components is enabled. For reference sake, it is also possible to set the inner diameter of the first outer race 41a and the inner diameter of the second outer race 42a to values different from each other. It is also possible to form the outer peripheral surface of the common inner race 43 into a shouldered cylindrical shape being different in radial position between the portion on the side of the first axial direction L1 and the portion on the side of the second axial direction L2.

Also, in this example, as shown in FIG. 1, the outer diameter of the first outer race 41a is formed to be slightly larger than the outer diameter of the second outer race 42a. However, it is also possible to determine the outer diameter of the first outer race 41a and the outer diameter of the second outer race 42a to be the same value, so that the outer races 41a, 42a are used as common components between the first one-way clutch 41 and the second one-way clutch 42.

Incidentally, the pump drive shaft 35 includes a surface extending in the direction intersecting the axial direction, and is provided with a pressure receiving portion 35a configured to receive a liquid pressure (a hydraulic pressure in this example) in the first axial direction L1 at the time when the oil pump 20 is driven as shown in FIG. 1. In this example, the pressure receiving portion 35a includes a surface whose normal line is parallel to the axial direction (second axial direction L2). More specifically, a portion of the pump drive shaft 35 engaging the inner rotor 20a is formed so as to have a shape whose section taken along the plane orthogonal to the axial line is formed in such a manner that peripheral edge portions thereof opposing to each other are notched linearly. In contrast, a portion of the pump drive shaft 35 arranged in the pump cover 21 has a circular shape in cross section taken along the surface orthogonal to the axial direction. By the configuration of the pump drive shaft 35 in this manner, the pressure receiving portion 35a having a surface whose normal line is directed in parallel to the second axial direction L2 is formed between the portion engaging the inner rotor 20a of the pump drive shaft 35 and the portion arranged in the pump cover 21. For reference sake, this pressure receiving portion 35a is formed in a portion communicating with the pump chamber as shown in FIG. 1, the hydraulic pressure generated by the oil pump 20 at the time when the corresponding oil pump is driven acts on the pressure receiving portion 35a, so that the pressure receiving portion 35a receives a pressing force directed in the first axial direction L1.

In contrast, on the side of the first axial direction L1 with respect to the oil pump 20 and the one-way clutches 41, 42, a supporting portion 50 configured to support the common inner race 43 from the side of the first axial direction L1 is arranged. The supporting portion 50 is fixed to a case (a driving apparatus case in this example), not shown, provided in the hydraulic pressure generating apparatus 1. More specifically, in this example, the supporting portion 50 is made up of a partition wall provided in the driving apparatus case for partitioning the space in the interior thereof in the axial direction. Then, a first thrust washer 61 which receives an axial load is arranged between the common inner race 43 and the supporting portion 50. In this example, the first thrust washer 61 is fixed to the supporting portion 50 in a state in which the circumferential relative rotation with respect to the supporting portion 50 is restricted by an engaging portion, not shown. In this embodiment, the first thrust washer 61 corresponds to a "thrust bearing" in the present invention.

With the configuration as described above, the pump drive shaft 35 is axially supported by the hydraulic pressure generated at the time when the oil pump 20 is driven from the side of the second axial direction L2, and is axially supported by drag generated according to the magnitude of the above-described hydraulic pressure, which the common inner race 43 receives from the supporting portion 50 via the first thrust washer 61, from the side of the first axial direction L1. Then, both of the pump drive shaft 35 and the common inner race 43 connected thereto is positioned in the axial direction in a state in which the common inner race 43 comes into abutment with the first thrust washer 61.

In this embodiment, by employing the configuration in which the pump drive shaft 35 is axially supported by the hydraulic pressure generated at the time when the oil pump 20 is driven from the side of the second axial direction L2 as described above, the thrust bearing which supports the common inner race 43 from the side of the second axial direction L2 can be omitted. Accordingly, a gap G can be formed between the coupling portion 44 of the common inner race 43 and the distal end portion 30a of the projecting portion 30 in the axial direction formed in the pump cover 21, as shown in an enlarged view in FIG. 1.

More specifically, in this embodiment, the gap G which allows oil to flow in the radial direction is formed between the distal end portion 30a of the projecting portion 30 and the coupling portion 44 in a state in which the common inner race 43 receives a pressure on the pressure receiving portion 35a and hence is supported by the supporting portion 50 from the side of the first axial direction L1. In other words, this gap G has an axial width which allows oil to flow in the radial direction at the time when the oil pump 20 is driven. For reference sake, in this example, the distal end portion 30a of the projecting portion 30 in the axial direction is arranged radially inside the body portion 45 at a position overlapping with the reservoir depression 46 when viewed in the radial direction. Although detailed description is given below, oil for lubricating the one-way clutches 41, 42 can be supplied satisfactorily using the gap G.

A second thrust washer 62 is disposed between the first outer race 41a and the second outer race 42a in the axial direction. In this example, the second thrust washer 62 is fixed to the first outer race 41a in a state in which the circumferential relative rotation with respect to the first outer race 41a is restricted by an engaging portion 62a. In addition, a third thrust washer 63 is disposed between the second outer race 42a and the surface of the pump cover 21 on the side of the first axial direction L1 in the axial direction. The third thrust washer 63 is fixed to the pump cover 21 in a state in which the relative rotation with respect to the pump cover 21 is restricted by an engaging portion, not shown, in this example.

Also, in this embodiment, a distal end portion 35b having a smaller diameter than the portion arranged in the pump cover 21 is formed on the side of the first axial direction L1 of the pump drive shaft 35. Then, the distal end portion 35b of the pump drive shaft 35 is arranged inside a hole (a through hole in this example) formed in the supporting portion 50 so as to extend in the axial direction. For reference sake, in this embodiment, the pump drive shaft 35 is radially supported by the pump case with high degree of accuracy, and, in addition, a bearing is omitted and a gap is formed between the outer peripheral surface of the distal end portion 35b and the inner peripheral surface of the above-described hole.

Incidentally, as described above, a configuration in which the body portion 45 is arranged so as to have a portion overlapping with the projecting portion 30 when viewed in the radial direction is employed in this embodiment in order to secure the supporting accuracy of the pump drive shaft 35 while restraining capsizing of the hydraulic pressure generating apparatus 1 in the axial direction. Then, by employing the arrangement configuration as described above, reduction of an axial offset between a supporting point of the pump drive shaft 35 by the pump case and load points of the two one-way clutches 41, 42 with respect to the pump drive shaft 35 is also enabled. In other words, a configuration which enables increase in longevity of the oil pump 20 while restraining inclination or deformation of the pump drive shaft 35.

In addition, as described above, both of the projecting portion 30 and the body portion 45 are formed into a cylindrical shape in this embodiment. Therefore, the radial gap between the projecting portion 30 and the body portion 45 can be reduced, so that reduction of diameter of the common inner race 43 and achievement of lightweight are possible while securing the strength.

2. Configuration of Oil Channel

Subsequently, a configuration of an oil channel provided in the hydraulic pressure generating apparatus 1 according to this embodiment for lubricating the one-way clutches 41, 42 will be described with reference to FIG. 1 and FIG. 2. As shown in FIG. 1, the pump case (the pump cover 21 in this example) is provided with a pump case inner flow channel 24 which communicates with a discharge port 23 of the oil pump 20. Also, the pump drive shaft 35 is provided with the first flow channel 31, second flow channels 32, and a third flow channel 33. Then, these flow channels form the oil channel for supplying oil discharged from the oil pump 20 to the one-way clutches 41, 42 or the thrust washers 61 to 63. For reference sake, in FIG. 1 and FIG. 2, the flow of oil at the time when the oil pump 20 is operated is conceptually shown by arrows of dot lines.

More specifically, the pump case inner flow channel 24 includes a first flow channel portion extending from the discharge port 23 in the first axial direction L1 and a second flow channel portion communicating with the corresponding first flow channel, extending in the radial direction, and opening to an inner peripheral surface of the insertion hole 27. Then, at the time when the oil pump 20 is operated, oil is supplied to the openings on the inner peripheral surface of the insertion hole 27 of the second flow channel portion via the first flow channel portion and the second flow channel portion.

The first flow channel 31 is formed so as to communicate with the pump case inner flow channel 24 via a passing portion 34 and extend in the axial direction. In this example, the passing portion 34 is formed on an outer peripheral surface of the pump drive shaft 35 and, more specifically, is a depression indented radially inward with a predetermined axial width. In this embodiment, the depression which constitutes the passing portion 34 is formed as a groove portion extending in the circumferential direction along the entire circumference, and the axial position thereof is the same as that of the openings on the inner peripheral surface of the insertion hole 27 of the above-described second flow channel portion provided in the pump case inner flow channel 24. Then, the first flow channel 31 includes a radially extending portion extending from the passing portion 34 to radially inside, and an axially extending portion arranged at the axial center of the pump drive shaft 35 and extending from the corresponding radially extending portion to the distal end portion 35b of the pump drive shaft 35 in the first axial direction L1. For reference sake, the case where the passing portion 34 is formed on the pump drive shaft 35 is shown here as an example, a configuration in which a portion having the similar function to the passing portion 34 is formed on the side of the pump case, or a configuration in which the pump case inner flow channel 24 and the first flow channel 31 are formed so as to communicate directly with each other are also applicable.

Second flow channels 32 are formed so as to communicate with the first flow channel 31, extend in the radial direction, and open to the outer peripheral surface of the pump drive shaft 35. As shown in FIG. 1 and FIG. 2, the second flow channels 32 are formed so as to extend radially outward from the axially extending portion of the first flow channel 31 along the radial direction and, in this example, the second flow channels 32 are formed respectively at two positions different in circumferential position by 180° from each other. Then, the openings of the second flow channels 32 on the outer peripheral surface of the pump drive shaft 35 correspond to the oil supply portions 32a to the reservoir depression 46 formed in the body portion 45 as shown in FIG. 1. The supply portions 32a are provided radially inside the reservoir depression 46. More specifically, the supply portions 32a are arranged so as to have a portion overlapping with the reservoir depression 46 when viewed in the radial direction.

Then, the gap G which allows oil to flow in the radial direction formed between the distal end portion 30a of the projecting portion 30 and the coupling portion 44 is located radially outside the supply portions 32a. Therefore, the oil supplied to the supply portions 32a flows radially outward by the action of centrifugal force, and is supplied to the reservoir depression 46 via the gap G. In this manner, the pump case inner flow channel 24, the passing portion 34, the first flow channel 31, and the second flow channels 32 form the oil channel for supplying oil discharged from the oil pump 20 to the reservoir depression 46, so that the oil can be supplied to the reservoir depression 46 using centrifugal force in association with the rotation of the pump drive shaft 35 at the time when the oil pump 20 is driven.

Incidentally, as described above, the body portion 45 includes the through hole 47 which communicates the reservoir depression 46 and the body portion outer peripheral surface 45a. Also, as shown in an enlarged view in FIG. 1, the common inner race 43 includes a first communicating channel 43c and a second communicating channel 43d. The first communicating channel 43c communicates the opening 48 of the through hole 47 on the body portion outer peripheral surface 45a with the first accommodating chambers 43a, and the second communicating channel 43d communicates the opening 48 of the through hole 47 on the body portion outer peripheral surface 45a with the second accommodating chambers 43b. Accordingly, oil supplied from the supply portions 32a to the reservoir depression 46 can be supplied to the first accommodating chambers 43a via the through hole 47 and the first communicating channel 43c, and can be supplied to the second accommodating chambers 43b via the through hole 47 and the second communicating channel 43d.

In this embodiment, the body portion outer peripheral surface 45a which is the outer peripheral surface of the body portion 45 is formed into a cylindrical shape. Then, as shown in FIG. 1, the body portion outer peripheral surface 45a is uniform in shape in axial direction including the outer peripheral depressions 45b shown in FIG. 2. In other words, the outer peripheral depressions 45b are formed not only respective insides of the first accommodating chambers 43a and the second accommodating chambers 43b arranged at the same circumferential position, but also between the first accommodating chambers 43a and the second accommodating chambers 43b in the axial direction.

In contrast, an inner peripheral surface of the axial center portion of the retainer 70 fixed to the outer peripheral surface of the body portion 45 is axially uniform cylindrical surface in this embodiment. Here, the expression "axially center portion of the retainer 70" means a portion other than locked portions with the body portion 45 on axial both sides. Therefore, as shown in the enlarged view in FIG. 1, a space between the body portion outer peripheral surface 45a and the inner peripheral surface of the retainer 70 (hereinafter, referred to as "internal space S of an inner race") is formed between the first accommodating chambers 43a and the second accommodating chambers 43b in the axial direction at the same circumferential position as the first accommodating chambers 43a and the second accommodating chambers 43b (more precisely, the same circumferential position as the outer peripheral depressions 45b). Then, the opening 48 of the through hole 47 is formed so as to communicate with the internal space S of the inner race. In other words, in this example, the opening 48 of the through hole 47 is arranged at the same circumferential position as the first accommodating chambers 43a and the second accommodating chambers 43b (more precisely, the same circumferential position as the outer peripheral depressions 45b). Then, the first communicating channel 43c extending from the opening 48 to the first accommodating chambers 43a in the first axial direction L1, and the second communicating channel 43d extending from the opening 48 to the second accommodating chambers 43b in the second axial direction L2 are formed in the internal space S.

For reference sake, in this example, as shown in FIG. 1 and FIG. 2, only the one through hole 47 is formed in the body portion 45, and the first accommodating chambers 43a and the second accommodating chambers 43b are configured to communicate with a common through hole 47a, which is the through hole 47 common to each other. For reference sake, a common opening 48a, which is the opening 48 of the common through hole 47a on the body portion outer peripheral surface 45a is formed between the first accommodating chambers 43a and the second accommodating chambers 43b in the axial direction (in this example, the center portion away from the first accommodating chambers 43a and the second accommodating chambers 43b equally in the axial direction). Therefore, the first communicating channel 43c and the second communicating channel 43d are formed so as to extend from the common opening 48a in the directions opposite from each other in the axial direction.

Then, the oil supplied to the first accommodating chambers 43a via the first communicating channel 43c flows from radially inside to radially outside in the first accommodating chambers 43a as shown in FIG. 2 by centrifugal force, and reaches a radially outside opening of the first accommodating chambers 43a (the inner peripheral surface of the first outer race 41a). Then, in a state in which the first outer race 41a rotates relatively with respect to the common inner race 43 in the second circumferential direction C2, the oil reaching the radially outside opening of the first accommodating chambers 43a (the inner peripheral surface of the first outer race 41a) flows in the second circumferential direction C2 with respect to the common inner race 43, and is supplied to a gap between the radially outside surfaces of the first block bearings 41d and the inner peripheral surface of the first outer race 41a as shown in FIG. 2. Accordingly, in a state in which the first outer race 41a is rotated relatively with respect to the common inner race 43 in the second circumferential direction C2, lubrication onto the radially outside surfaces of the first block bearings 41d and the inner peripheral surface of the first outer race 41a as sliding surfaces is achieved.

Although illustration is omitted, the oil supplied to the second accommodating chambers 43b via the second communicating channel 43d also flows in the second accommodating chambers 43b from radially inside to radially outside in the same manner, and reaches the radially outside opening of the second accommodating chambers 43b (the inner peripheral surface of the second outer race 42a). Then, in a state in which the second outer race 42a rotates relatively with respect to the common inner race 43 in the second circumferential direction C2, the oil reaching the radially outside opening of the second accommodating chambers 43b (the inner peripheral surface of the second outer race 42a) flows in the second circumferential direction C2 with respect to the common inner race 43, and is supplied to gaps between the radially outside surfaces of the second block bearings 42d and the inner peripheral surface of the second outer race 42a. Accordingly, in a state in which the second outer race 42a is rotated relatively with respect to the common inner race 43 in the second circumferential direction C2, lubrication of the radially outside surfaces of the second block bearings 42d and the inner peripheral surface of the second outer race 42a as sliding surfaces is achieved.

Then, part of the oil supplied to the first accommodating chambers 43a or the second accommodating chambers 43b is supplied to the second thrust washer 62 from radially inside via a gap between the outer peripheral surface of the axially center portion of the retainer 70 and the inner peripheral surfaces of the outer races 41a, 42a as shown in FIG. 1. Also, part of the oil supplied to the second accommodating chambers 43b is supplied to the third thrust washer 63 from radially inside via a gap between the outer peripheral surface of a portion of the retainer 70 on the side of the second axial direction L2 and the inner peripheral surface of the second outer race 42a. Also, in a case where the amount of oil supplied from the supply portions 32a to the reservoir depression 46 is large, part of the oil is not supplied to the through hole 47, flows beyond the dam portion 45c, and is supplied to the third thrust washer 63 from radially inside via the gap between the body portion 45 and the pump cover 21 on the side of the second axial direction L2 with respect to the body portion 45. Accordingly, lubrication of the second thrust washer 62 or the third thrust washer 63 is performed. Also, part of the oil supplied to the second thrust washer 62 or the third thrust washer 63 is supplied to the first driven gear 41b or the second driven gear 42b, so that lubrication of the engaging portion between the first driven gear 41b and the first driving gear 51a and the engaging portion between the second driven gear 42b and the second driving gear 52a is performed.

The third flow channel 33 provided in the pump drive shaft 35 is formed on the side of the first axial direction L1 with respect to the second flow channels 32 so as to communicate with the first flow channel 31, and extends in the radially direction, thereby opening through the outer peripheral surface of the pump drive shaft 35, which is radially inside the first thrust washer 61. As shown in FIG. 1, the third flow channel 33 is formed so as to extend radially outward from the axially extending portion of the first flow channel 31 along the radial direction. Also, in this example, the third flow channel 33 is formed on the distal end portion 35b of the pump drive shaft 35 having the smaller diameter and being provided on the side of the first axial direction L1. Then, the pump case inner flow channel 24, the passing portion 34, the first flow channel 31, and the third flow channel 33 from an oil channel for supplying the oil discharged for the oil pump 20 to the first thrust washer 61. In other words, in this example, the oil channel for supplying the oil discharged from the oil pump 20 to the first thrust washer 61 is formed using part of the oil channel for supplying the oil discharged from the oil pump 20 to the reservoir depression 46. Then, with the provision of the oil channel as described above, the oil can be supplied to the first thrust washer 61 using centrifugal force generated in association with the rotation of the pump drive shaft 35 at the time when the oil pump 20 is driven.

For reference sake, as described above, the gap is formed between the outer peripheral surface of the distal end portion 35b of the pump drive shaft 35 and the inner peripheral surface of the through hole formed in the supporting portion 50. Then, this gap has a size which limits the flow of oil in the first axial direction L1. Oil supplied from the third flow channel 33 to a gap between the supporting portion 50 and the common inner race 43 is subject to centrifugal force according to the rotational speed of the pump drive shaft 35. Therefore, the oil supplied from the third flow channel 33 to the gap between the supporting portion 50 and the common inner race 43 is prevented from flowing in the first axial direction L1 via the gap between the outer peripheral surface of the distal end portion 35b of the pump drive shaft 35 and the inner peripheral surface of the through hole provided in the supporting portion 50. In other words, most part of the oil supplied from the third flow channel 33 is supplied to the first thrust washer 61 from radially inside and used for lubrication of the corresponding first thrust washer 61.

3. Configuration of Driving Apparatus

Figure 3:
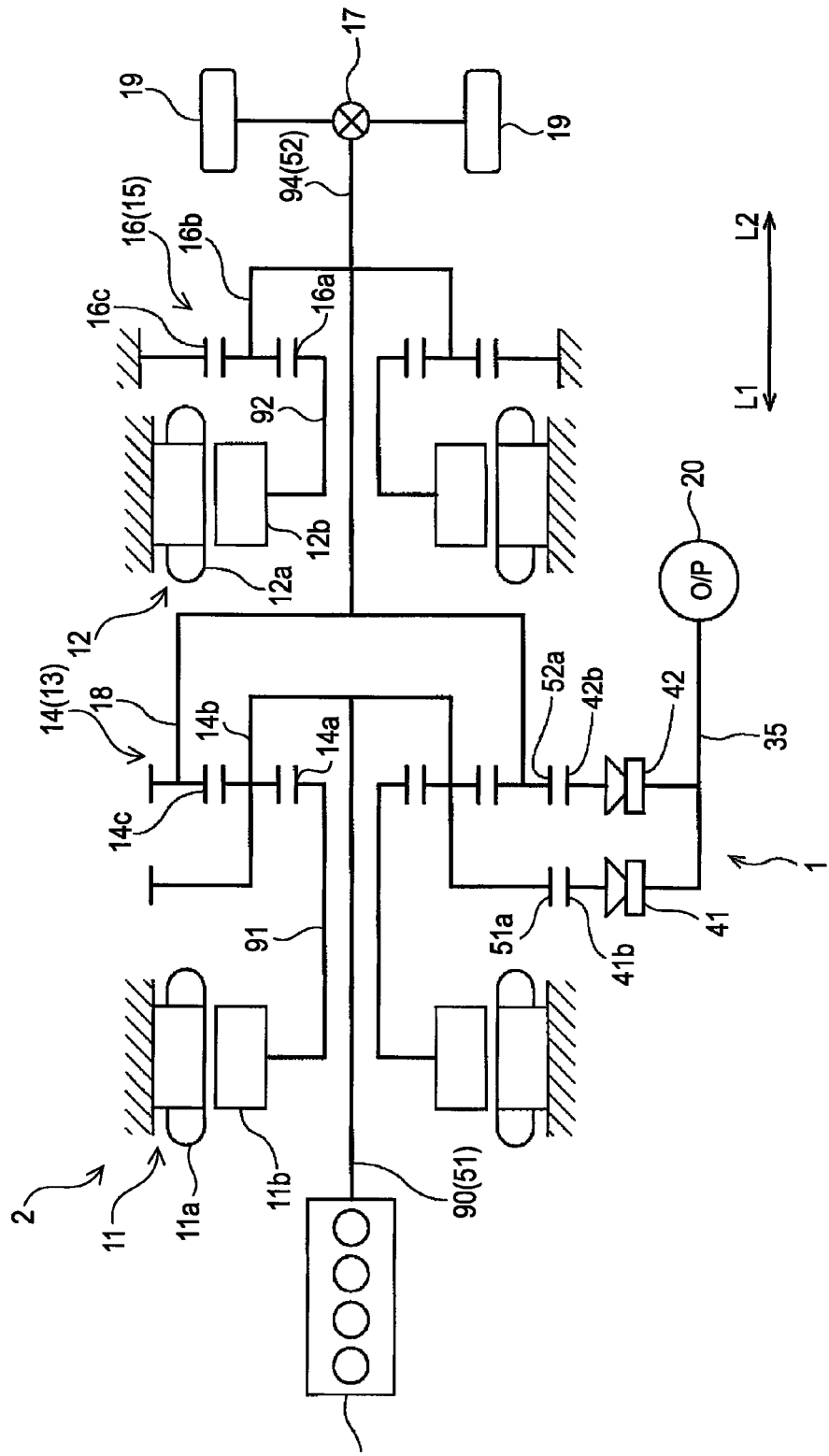
FIG. 3 is a diagrammatic sketch showing a driving apparatus according to an embodiment of the present invention.

Subsequently, a configuration of the vehicle driving apparatus 2 in this embodiment will be described with reference to FIG. 3. As shown in FIG. 3, the vehicle driving apparatus 2 according to this embodiment is a driving apparatus for a hybrid vehicle using an internal combustion engine 10 and one or both of the dynamo-electric machines 11, 12 as driving power sources for the vehicle. In other words, the vehicle driving apparatus 2 is configured as so-called a hybrid driving apparatus of a two-motor split type having the first dynamo-electric machine 11 and the second dynamo-electric machine 12 as the driving power sources.

The vehicle driving apparatus 2 includes an input shaft 90 drive-coupled to the internal combustion engine 10, an output shaft 94 drive-coupled to wheels 19, and a drive transmission device 13 configured to transmit a driving power selectively between the input shaft 90 and the output shaft 94, and further includes the first dynamo-electric machine 11, the second dynamo-electric machine 12, a transmission 15, and the output differential gear device 17. The vehicle driving apparatus 2 also includes the above-described hydraulic pressure generating apparatus 1, and is configured in such a manner that the input shaft 90 functions as a first pump driving member 51 which drives an outer race of the first one-way clutch 41, and the output shaft 94 functions as a second pump driving member 52 which drives an outer race of the second one-way clutch 42. Accordingly, the vehicle driving apparatus 2 is configured to be capable of supplying oil for lubrication, cooling down, or the like of various portions of the vehicle driving apparatus 2.

The above-described respective components provided in the vehicle driving apparatus 2 are accommodated in a driving apparatus case, not shown, fixed to a vehicle body. Then, the partition wall provided in the driving apparatus case constitutes the above-described supporting portion 50 (see FIG. 1). Also, in this example, as shown in FIG. 3, the input shaft 90, the output shaft 94, the first dynamo-electric machine 11, the second dynamo-electric machine 12, the drive transmission device 13, and the transmission 15 are arranged coaxially, and the hydraulic pressure generating apparatus 1 (more specifically, the pump drive shaft 35) is arranged on an axis different from the axis where the input shaft 90 and the like are arranged. Then, the drive transmission device 13 includes a first differential gear mechanism 14, and the transmission 15 includes a second differential gear mechanism 16. In this embodiment, the first differential gear mechanism 14 corresponds to a "differential gear mechanism" in the present invention. Hereinafter, the configuration of the vehicle driving apparatus 2 according to this embodiment will be described in detail.

The input shaft 90 is drive-coupled to the internal combustion engine 10. Here, the internal combustion engine 10 is an apparatus which is driven by combustion of fuel in the interior of the engine for generating a motive power and, for example, various types of known engines such as a gasoline engine or a diesel engine can be used. In this example, the input shaft 90 is drive-coupled to an output revolving shaft such as a crankshaft of the internal combustion engine 10 so as to be rotated integrally therewith. For reference sake, a configuration in which the input shaft 90 is drive-coupled to the output revolving shaft of the internal combustion engine 10 via other members such as a damper or a clutch is also possible.

The first dynamo-electric machine 11 includes a stator 11a fixed to the driving apparatus case, and a rotor 11b rotatably supported in the radially inside this stator 11a. This rotor 11b of the first dynamo-electric machine 11 is fixed to a first rotor shaft 91, and the rotor 11b of the first dynamo-electric machine 11 is drive-coupled to a sun gear 14a of the first differential gear mechanism 14 so as to be rotated integrally therewith via the first rotor shaft 91. Also, the second dynamo-electric machine 12 includes a stator 12a fixed to the driving apparatus case, and a rotor 12b rotatably supported in the radially inside the stator 12a. The rotor 12b of the second dynamo-electric machine 12 is fixed to a second rotor shaft 92, and the rotor 12b of the second dynamo-electric machine 12 is drive-coupled to a sun gear 16a of the second differential gear mechanism 16 so as to be rotated integrally therewith via this second rotor shaft 92. The first dynamo-electric machine 11 and the second dynamo-electric machine 12 are electrically connected to a condenser, not shown. The condenser is configured, for example, using a battery, a capacitor, or the like.

The first dynamo-electric machine 11 and the second dynamo-electric machine 12 are capable of achieving a function as a motor (electric motor) which generates a motive power upon receipt of supply of an electric power and a function as a generator (power generator) which generates an electric power upon receipt of supply of a motive power, respectively. Here, the first dynamo-electric machine 11 and the second dynamo-electric machine 12 generate electricity by a torque of the internal combustion engine 10 or an inertial force of the vehicle, charge the condenser, or supply an electric power for driving the other dynamo-electric machines 11, 12 which function as a motor when functioning as a generator. In contrast, the first dynamo-electric machine 11 and the second dynamo-electric machine 12 are charged by the condenser, or power upon receipt of the electric power generated by the other dynamo-electric machines 11, 12 which function as the generator when functioning as the motor.

The drive transmission device 13 includes the first differential gear mechanism 14 as a planetary gear mechanism of a single pinion type arranged coaxially with the input shaft 90. The first differential gear mechanism 14 includes a carrier 14b supporting a plurality of pinion gears, and the sun gear 14a and a ring gear 14c which engages the pinion gear respectively as rotating elements. In other word, the first differential gear mechanism 14 includes three rotating elements. The sun gear 14a is drive-coupled to the first dynamo-electric machine 11. More specifically, the sun gear 14a is drive-coupled to the first rotor shaft 91 fixed to the rotor 11b of the first dynamo-electric machine 11 so as to be rotated integrally therewith. The carrier 14b is drive-coupled to the internal combustion engine 10. More specifically, the carrier 14b is drive-coupled to the input shaft 90 so as to be rotated integrally therewith. Also, the ring gear 14c is drive-coupled to the second dynamo-electric machine 12 and the wheels 19. More specifically, the ring gear 14c is an output rotating element of the drive transmission device 13 (the first differential gear mechanism 14), and is drive-coupled to the output shaft 94 so as to be rotated integrally therewith. The ring gear 14c is drive-coupled to the second rotor shaft 92 fixed to the rotor 12b of the second dynamo-electric machine 12 via the transmission 15. These three rotating elements are the sun gear 14a, the carrier 14b, and the ring gear 14c in the order of rotational speed. Therefore, in this embodiment, the sun gear 14a, the carrier 14b, and the ring gear 14c correspond respectively to a "first rotating element", a "second rotating element", and a "third rotating element" according to the present invention.

In this embodiment, as shown also in FIG. 1, the ring gear 14c is formed on an inner peripheral surface of a distributor output member 18. Here, the distributor output member 18 is a cylindrical member provided so as to surround the radially outside the first differential gear mechanism 14, and is drive-coupled to the output shaft 94 so as to be rotated integrally therewith. Also, formed on an outer peripheral surface of the distributor output member 18 is a second driving gear 52a which is a gear engaging the second driven gear 42b formed on the second outer race 42a of the second one-way clutch 42. Also, the carrier 14b is coupled to the first driving gear 51a which is a gear engaging the first driven gear 41b formed on the first outer race 41a of the first one-way clutch 41.

Then, the drive transmission device 13 achieves a function as a power distributing device which distributes a torque of the internal combustion engine 10 entered via the input shaft 90 to the first dynamo-electric machine 11 and the distributor output member 18 (the output shaft 94). Also, by controlling the rotational speed and the torque of the first dynamo-electric machine 11 in a state in which the torque of the input shaft 90 (the internal combustion engine 10) is entered to the carrier 14b of this drive transmission device 13 (the first differential gear mechanism 14), the rotational speed of the input shaft 90 can be varied continuously and transmitted to the ring gear 14c and the distributor output member 18 (the output shaft 94). Accordingly, an electric continuous variable transmission mechanism is made up of the input shaft 90, the drive transmission device 13, and the first dynamo-electric machine 11.

The transmission 15 includes the second differential gear mechanism 16 as a planetary gear mechanism of a single pinion type arranged coaxially with the output shaft 94. In other words, the second differential gear mechanism 16 includes a carrier 16b supporting a plurality of pinion gears, the sun gear 16a, and a ring gear 16c which engage the pinion gear respectively as rotating elements. The sun gear 16a is drive-coupled to the second rotor shaft 92 fixed to the rotor 12b of the second dynamo-electric machine 12 so as to be rotated integrally therewith. The carrier 16b is drive-coupled to the output shaft 94 so as to be rotated integrally therewith. The ring gear 16c is fixed to the driving apparatus case. In this embodiment, since the transmission 15 is configured as described above, the rotational speed of the second dynamo-electric machine 12 is reduced and the torque thereof is amplified according to the gear ratio between the sun gear 16a and the ring gear 16c, and then is transmitted to the output shaft 94. In other words, the transmission 15 functions as a speed reducer having single reduction stage. For reference sake, as a transmission mechanism provided in the transmission 15, any types of known transmission mechanisms may be employed as the transmission mechanism, and the transmission 15 can be made up of a transmission mechanism having single speed increasing gear, a multi-clutch transmission mechanism having a plurality of gear speeds (one or both of the speed reduction gear and speed increasing gear), or a continuous variable transmission mechanism. Also, a configuration in which the vehicle driving apparatus 2 does not have the transmission 15, and the second rotor shaft 92 and the output shaft 94 are drive-coupled so as to be rotated integrally with each other is also applicable.

The output shaft 94 is drive-coupled to the ring gear 14c of the drive transmission device 13 (the first differential gear mechanism 14) so as to be rotated integrally therewith and is drive-coupled to the carrier 16b of the transmission 15 (the second differential gear mechanism 16) so as to be rotated integrally therewith. Also, the output shaft 94 is drive-coupled to the wheels 19 via the output differential gear device 17. The output differential gear device 17 is configured using, for example, a plurality of bevel gears meshing with respect to each other. Then, transmitted to the output shaft 94 are the torque of the internal combustion engine 10 distributed via the drive transmission device 13 as described above and the torque of the second dynamo-electric machine 12 amplified by the transmission 15. Then, by the transmission of these torque transmitted to the output shaft 94 to the wheels 19, the vehicle is caused to travel.

With the configuration as described above, the vehicle driving apparatus 2 according to this embodiment is selectively includes a hybrid traveling mode for traveling by the output torques of both of the internal combustion engine 10 and the dynamo-electric machines 11, 12, and an EV (electric) traveling mode for traveling by the output torque of the second dynamo-electric machine 12 in a state in which the internal combustion engine 10 is stropped. In the hybrid traveling mode, the internal combustion engine 10 is brought into an operating state, and is brought into a state in which the torque of the internal combustion engine 10 is distributed to the first dynamo-electric machine 11 and the distributor output member 18 by the drive transmission device 13. In the EV traveling mode, the rotational speed of the output revolving shaft of the internal combustion engine 10 becomes zero by a frictional force in the interior of the internal combustion engine 10. In other words, the rotational speed of the input shaft 90 becomes zero. Also, in the EV traveling mode, the first dynamo-electric machine 11 is controlled so that the output torque becomes zero, and the first rotor shaft 91 which supports the rotor 11b of the first dynamo-electric machine 11 is brought into a state of being freely rotatable.

As shown in FIG. 3, in this embodiment, the first driving gear 51a is drive-coupled to the input shaft 90 drive-coupled to the internal combustion engine 10. More specifically, the first driving gear 51a is drive-coupled so as to be rotatable integrally with the input shaft 90. Therefore, at the time when the internal combustion engine 10 is operated (at the time when the internal combustion engine 10 generates a driving power, and at the time when the output revolving shaft of the internal combustion engine 10 is rotated in the normal direction), the input shaft 90 is driven by the internal combustion engine 10, and the first driving gear 51a is driven by the input shaft 90. Therefore, in this embodiment, the input shaft functions as the first pump driving member 51 which drives the first outer race 41a.

Also, the second driving gear 52a is drive-coupled to the output shaft 94 which is drive-coupled to the wheels 19. More specifically, the output shaft 94 is drive-coupled to the wheels 19 via the output differential gear device 17, and is configured in such a manner that the output shaft 94 rotates when the wheels 19 rotate, and that the output shaft 94 does not rotate when the wheels 19 are not rotated. Also, the second driving gear 52a is drive-coupled with the output shaft 94 so as to be rotated integrally therewith. Therefore, when the wheels 19 (the output shaft 94) rotate, the second driving gear 52a is driven by the output shaft 94. Therefore, in this embodiment, the output shaft 94 functions as the second pump driving member 52 which drives the second outer race 42a.

Incidentally, in this embodiment, since the transmission 15 is configured as described above, the second rotor shaft 92 is also rotated when the output shaft 94 is rotated. In other words, in this example, when the output shaft 94 as the second pump driving member 52 is rotated, both of the wheels 19 and the second rotor shaft 92 are rotated. Therefore, according to the traveling state of the vehicle, the output shaft 94 as the second pump driving member 52 can take both a state of being driven by the wheels 19 and a state of being driven by the second dynamo-electric machine 12.

In this manner, in this embodiment, the second pump driving member 52 is drive-coupled to both of the wheels 19 and the second dynamo-electric machine 12. Then, from the viewpoint that the second pump driving member 52 is drive-coupled to the wheels 19, the internal combustion engine 10 corresponds to the "driving power source" in the present invention, while from the viewpoint that the second pump driving member 52 is drive-coupled to the second dynamo-electric machine 12, the internal combustion engine 10 and the second dynamo-electric machine 12 correspond to the "first driving power source" and the "second driving power source" in the present invention, respectively.

For reference sake, as described above, the restricted directions of relative rotation with respect to the common inner race 43 of the respective outer races 41a, 42a of the two one-way crutches 41, 42 are identical to each other (the first circumferential direction C1 in this example). Then, when the internal combustion engine 10 is in operation, the first outer race 41a is configured to be driven in the first circumferential direction C1. In other words, the internal combustion engine 10 and the first pump driving member 51 are drive-coupled so that the driven direction of the first outer race 41a by the first pump driving member 51 when the internal combustion engine 10 is in operation (that is, at the time when the driving power is generated) corresponds to the restricted direction of relative rotation with respect to the common inner race 43 (the first circumferential direction C1 in this example).

Also, the second outer race 42*a* is configured to be driven in the first circumferential direction C1 when the vehicle travels forward (at the time when the wheels 19 rotate in the normal direction). In other words, the wheels 19 and the second pump driving member 52 are drive-coupled so that the driven direction of the second outer race 42*a* by the second pump driving member 52 when the vehicle travels forward (that is, at the time when the wheels 19 rotate in the normal direction) corresponds to the restricted direction of relative rotation with respect to the common inner race 43 (the first circumferential direction C1 in this example). When viewed on the basis of the relationship with respect to the second dynamo-electric machine 12, the second dynamo-electric machine 12 and the second pump driving member 52 are drive-coupled so that the driven direction of the second outer race 42*a* by the second pump driving member 52 when the second dynamo-electric machine 12 rotates in the normal direction (that is, at the time when the wheels 19 rotate in the normal direction) corresponds to the restricted direction of relative rotation with respect to the common inner race 43 (the first circumferential direction C1 in this example).

Since it is configured to transmit the driving power selectively between the input shaft 90 as the first pump driving member 51 and the output shaft 94 as the second pump driving member 52 via the drive transmission device 13, the first pump driving member 51 and the second pump driving member 52 can take a state of rotating independently from each other. Then, if at least either one of the input shaft 90 and the output shaft 94 is rotated to the side which drives the oil pump 20, the oil pump 20 can be driven to generate the hydraulic pressure. Accordingly, in various states of traveling of the vehicle such as the state in which the wheels 19 are stopped and the internal combustion engine 10 is in operation or the state in which the wheels 19 are rotated and the internal combustion engine 10 is stopped, oil can be supplied to portions in the vehicle driving apparatus 2 which require the oil.

More specifically, in a state in which the vehicle is stopped or moving backward and the internal combustion engine 10 is in operation, the oil pump 20 is driven by the first driving gear 51*a* (the first pump driving member 51). In this state, the input shaft 90 as the first pump driving member 51 is driven by the internal combustion engine 10.

Also, in a state in which the vehicle is traveling forward and the internal combustion engine 10 is stopped, the oil pump 20 is driven by the second driving gear 52*a* (the second pump driving member 52). For example, when the vehicle driving apparatus 2 selects the EV mode for example, it brings about such a state. Then, in this state, when the vehicle is traveling forward by the torque of the second dynamo-electric machine 12, the output shaft 94 as the second pump driving member 52 is driven by the torque of the second dynamo-electric machine 12, while when the vehicle is traveling forward by an inertial force, the output shaft 94 as the second pump driving member 52 is driven by the rotation of the wheels 19.

Then, when the vehicle is traveling forward and the internal combustion engine 10 is in operation, the drive gears for driving the oil pump 20 (the pump driving members) are switched according to the rotational speeds of the first outer race 41*a* and the second outer race 42*a*. In other words, when the rotational speed of the first outer race 41*a* is higher than the rotational speed of the second outer race 42*a*, the oil pump 20 is driven by the first driving gear 51*a* (the first pump driving member 51), while when the rotational speed of the first outer race 41*a* is lower than the rotational speed of the second outer race 42*a*, the oil pump 20 is driven by the second driving gear 52*a* (the second pump driving member 52). Also, when the rotational speed of the first outer race 41*a* is equal to the rotational speed of the second outer race 42*a*, the oil pump 20 is driven by both of the first driving gear 51*a* (the first pump driving member 51) and the second driving gear 52*a* (the second pump driving member 52).

Incidentally, as described above, in this embodiment, the one-way clutch whose outer race is driven by the pump driving member which is drive-coupled to the internal combustion engine 10 is designated as the first one-way clutch 41. In other words, the first pump driving member 51 which drives the first outer race 41*a* of the first one-way clutch 41 is drive-coupled to the internal combustion engine 10. Then, as described above, the first driven gear 41*b* which meshes with the first driving gear 51*a* which is drive-coupled to the first pump driving member 51 is arranged so as to have a portion located at the same axial position as the coupling portion 44 (see FIG. 1). Therefore, in this example, the first driven gear 41*b* which is subjected to transfer of vibrations of the internal combustion engine 10 is arranged at a portion of the common inner race 43 having a high supporting strength (the portion close to the coupling portion 44 in the axial position). Accordingly, prevention of the common inner race 43 from being vibrated by the vibrations of the internal combustion engine 10 is enabled.

4. Other Embodiments

Finally, other embodiments of the present invention will be described. For reference sake, usage of characteristics disclosed in the respective embodiments shown below is not limited to the corresponding embodiments, and can be applied to other embodiments as long as no contradiction arises.

(1) In the embodiment described above, the case where the first accommodating chambers 43*a* and the second accommodating chambers 43*b* are configured to communicate with the common through hole 47*a* which is the through hole 47 common to each other has been described as an example. However, the embodiment of the present invention is not limited thereto, and a configuration in which the body portion 45 includes a plurality of the through holes 47, and the first accommodating chambers 43*a* and the second accommodating chambers 43*b* communicate with the through holes 47 different from each other is also applicable. In such a case, the positions of formation of the openings 48 of the through holes 47 are not limited to between the first accommodating chambers 43*a* and the second accommodating chambers 43*b* in the axial direction, but may be the side of the first axial direction L1 with respect to the first accommodating chambers 43*a*, the side of the second axial direction L2 with respect to the second accommodating chambers 43*b*, or the same axial positions as the first accommodating chambers 43*a* and the second accommodating chambers 43*b*. In a case where the openings 48 of the through holes 47 are formed at the same axial positions as the first accommodating chambers 43*a* and the second accommodating chambers 43*b*, the first communicating channel 43*c* and the second communicating channel 43*d* may be omitted.

(2) In the embodiment described above, the configuration in which the body portion 45 includes the one common through hole 47*a* has been described as an example. However, a configuration in which a plurality of the common through holes 47*a* are formed at positions different from each other in the circumferential direction corresponding to a plurality of the outer peripheral depressions 45*b* is also applicable.

(3) In the embodiment described above, the configuration in which the common opening 48a is formed between the first accommodating chambers 43a and the second accommodating chambers 43b in the axial direction has been described as an example. However, the embodiment of the present invention is not limited thereto, and a configuration in which the common opening 48a is formed on the side of the first axial direction L1 with respect to the first accommodating chambers 43a or on the side of the second axial direction L2 with respect to the second accommodating chambers 43b is also applicable. In this configuration, unlike the embodiments described above, the first communicating channel 43c and the second communicating channel 43d are formed so as to extend in the same side from the common opening 48a in the axial direction with respect to each other. It is also possible to form the common opening 48a on the same axial position as the first accommodating chambers 43a and the second accommodating chambers 43b and, in such a configuration, either one of the first communicating channel 43c and the second communicating channel 43d can be omitted.

(4) In the embodiment described above, the configuration in which the oil supplied to the opening portion 48 of the through hole 47 is supplied to the gaps between the block bearings 41d, 42d and the outer races 41a, 42a via the first accommodating chambers 43a and the second accommodating chamber 43b has been described as an example. However, the embodiment of the present invention is not limited thereto, and a configuration in which a retainer through hole which communicates the inner peripheral surface and the outer peripheral surface of the retainer 70 is formed on the corresponding retainer 70, so that oil is supplied to the gap between the block bearings 41d, 42d and the outer races 41a, 42a from the opening 48 of the through hole 47 via the corresponding retainer through hole is also applicable.

(5) In the embodiment described above, the configuration in which the pump drive shaft 35 is supported on the axially one side has been described as an example. However, the embodiment of the present invention is not limited thereto, and a configuration in which the pump drive shaft 35 is supported by, for example, the pump case and the supporting portion 50 on the both sides in the axial direction is also applicable. Also, in the embodiment described above, the configuration in which the pump case includes the projecting portion 30 projecting from the corresponding pump case in the first axial direction L1 and radially supporting the pump drive shaft has been described as an example. However, a configuration in which the pump case does not include the projecting portion 30 is also possible. In this case, the configuration becomes such that a member which constitutes the pump case is not arranged radially inside the reservoir depression 46.

(6) In the embodiment described above, the configuration in which the pump drive shaft 35 includes the pressure receiving portion 35a has been described as an example. However, the embodiment of the present invention is not limited thereto, and a configuration in which the pump drive shaft 35 does not include the pressure receiving portion 35a is also applicable. In this configuration, a configuration in which a thrust bearing which axially supports the common inner race 43 from the side of the second axial direction L2 is disposed between the common inner race 43 and the pump case is applicable.

(7) In the embodiment describe above, the configuration in which the inner race (the common inner race 43) includes the retainer 70 has been described as an example. However, the embodiment of the present invention is not limited thereto, and a configuration in which the outer races 41a, 42a include the retainers is also applicable. In this case, the configuration becomes such that the first outer race 41a and the second outer race 42a include the retainers individually, and the retainer provided for the first outer race 41a rotates integrally with the first outer race 41a, and the retainer provided for the second outer race 42a rotates integrally with the second outer race 42a. Plus, in this configuration, since the radially inner surface of the block bearing arranged in the retainer serves as the sliding surface, oil can be supplied to the sliding surfaces without the intermediary of the accommodating chamber formed in the retainer as in the embodiments described above. In other words, in this configuration, the configuration not provided with first communicating channel 43c and the second communicating channel 43d is applicable.

(8) In the embodiment described above, the configuration in which the first thrust washer 61 is arranged between the common inner race 43 and the supporting portion 50 has been described as an example. However, the embodiment of the present invention is not limited thereto, and a configuration in which the first thrust washer 61 is not provided, and the surface of the supporting portion 50 on the side of the second axial direction L2 serves as the sliding surface with respect to the common inner race 43 is also applicable. In other words, the configuration in which the surface of the common inner race 43 on the side of the first axial direction L1 and the surface of the supporting portion 50 on the side of the second axial direction L2 come into abutment is applicable.

(9) In the embodiment described above, the configuration in which the internal space S of the inner race for forming the first communicating channel 43c and the second communicating channel 43d is formed by the outer peripheral depressions 45b of the body portion outer peripheral surface 45a has been described as an example. However, the embodiment of the present invention is not limited thereto, and a configuration in which the internal space S of the inner race is formed by a depression formed on the inner peripheral surface of the retainer 70 so as to be indented radially outward and the outer peripheral depressions 45b, or a configuration in which it is formed only by the depression provided on the inner peripheral surface of the retainer 70 so as to be indented radially outwardly is also applicable.

(10) In the embodiment described above, the configuration in which both of the projecting portion 30 and the body portion 45 are formed into a cylindrical shape has been described as an example. However, the embodiment of the present invention is not limited thereto, and it is also possible to form at least one of the projecting portion 30 and the body portion 45 into a shape other than the cylindrical shape. For example, the projecting portion 30 may be formed into a tubular member having a polygonal shape in cross section taken along a plane orthogonal to the axial direction of the outer peripheral surface. Also, for example, the body portion 45 may be formed into a tubular member having a polygonal shape in cross section taken along a plane orthogonal to the axial direction of the inner peripheral surface.

(11) In the embodiment described above, the configuration in which the first thrust washer 61 is arranged between the common inner race 43 and the supporting portion 50 has been described as an example. However, the embodiment of the present invention is not limited thereto, and a configuration in which the thrust bearing for receiving the load in the axial direction is arranged between the pump drive shaft 35 having the common inner race 43 fixed thereto and the supporting portion 50 is also applicable.

(12) In the embodiment described above, the configuration in which the supply portions 32a of oil with respect to the reservoir depression 46 is formed in the pump drive shaft 35 has been described as an example. However, the embodiment of the present invention is not limited thereto, and a configuration in which the supply portions of oil with respect to the reservoir depression 46 is formed on a portion of the pump case located radially inside the reservoir depression 46 is also one of preferred embodiments of the present invention. In this configuration, a configuration in which the flow channel formed in the interior of the pump drive shaft 35 is included in the oil channel extending from the discharge port 23 to the corresponding supply portion as in the embodiment described above is also applicable, and a configuration in which the flow channel formed in the interior of the pump drive shaft 35 is not included therein is also applicable. In the former case, the configuration may be such that, for example, the second flow channels 32 are formed at positions overlapping with the projecting portion 30 when viewed in the radial direction, and a projecting portion inner flow channel communicating with the second flow channels 32 and opening through the outer peripheral surface of the projecting portion 30 are formed in the projecting portion 30, whereby the opening of the projecting portion inner flow channel on the outer peripheral surface of the projecting portion 30 is used as the supply portion of the oil with respect to the reservoir depression 46 is also applicable. In this configuration, a configuration in which the gap G which allows oil to flow in the radial direction is not formed between the distal end portion 30a of the projecting portion 30 and the coupling portion 44 is also applicable. In the latter case, the oil channel extending from the discharge port 23 to the corresponding supply portion can be formed only by the flow channel in the pump case.

(13) In the embodiment described above, the configuration in which the oil channel for supplying oil discharged from the oil pump 20 to the first thrust washer 61 is formed using part of the oil channel for supplying the oil discharged from the oil pump 20 to the reservoir depression 46 has been described as an example. However, the embodiment of the present invention is not limited thereto, and a configuration in which an oil channel for supplying the oil discharged from the oil pump 20 to the first thrust washer 61 is provided independently from the oil channel for supplying the oil discharged from the oil pump 20 to the reservoir depression 46 is also applicable. Also, a configuration in which oil is supplied from radially outside to the first thrust washer 61 is also possible.

(14) In the embodiment described above, the configuration in which the one-way clutches 41, 42 include the block bearings 41d, 42d has been described as an example, however, a configuration in which the one-way clutches 41, 42 do not have the block bearings 41d, 42d is also applicable. In this configuration, the radially outside surface of the retainer 70 serves as the sliding surface with respect to the outer races 41a, 42a.

(15) In the embodiment described above, the configuration in which the pump drive shaft 35 and the pump rotor (inner rotor 20a) are arranged concentrically has been described as an example, however, a configuration in which the pump drive shaft 35 and the pump rotor are arranged on axes different from each other is also applicable. In this configuration, the configuration in which the pump drive shaft 35 to which the coupling portion 44 is fixed and the pump rotor supporting shaft to which the pump rotor is fixed, which are arranged on the different axes from each other, are drive-coupled with a gear mechanism or the like is also applicable.

(16) In the embodiment described above, the configuration in which the reservoir depression 46 is formed over the entire area in the circumferential direction and the end portion of the reservoir depression 46 on the side of the first axial direction L1 is arranged at the same axial position as the end portion of the coupling portion 44 on the side of the second axial direction L2 has been described as an example. However, the embodiment of the present invention is not limited thereto, and a configuration in which the reservoir depression 46 is formed in part of an area of the inner peripheral surface of the body portion 45 in the circumferential direction, or a configuration in which the end portion of the reservoir depression 46 on the side of the first axial direction L1 is positioned on the side of the second axial direction L2 with respect to the end portion of the coupling portion 44 on the side of the second axial direction L2 is also applicable. Plus, in the latter configuration, unlike the embodiment described above, a configuration in which the distal end portion 30a of the projecting portion 30 in the axial direction is arranged at a position on the side of the first axial direction L1 with respect to the reservoir depression 46 when viewed in the radial direction is applicable. For reference sake, in this case, the distal end portion 30a of the projecting portion 30 can be made to have a diameter smaller than the portion on the side of the second axial direction L2.

(17) In the embodiment described above, the configuration in which all of the first thrust bearing, the second thrust bearing, and the third thrust bearing are sliding bearings (thrust washers) has been described as an example. However, the embodiment of the present invention is not limited thereto, and a configuration in which at least any one of the first thrust bearing, the second thrust bearing, and the third thrust bearing, is a rolling bearing provided with a rotating body (ball or roller) is also possible.

(18) In the embodiment described above, the configuration in which both of the first one-way clutch 41 and the second one-way clutch 42 are the roller-type one-way clutches has been described as an example. However, the embodiment of the present invention is not limited thereto, and at least one of the first one-way clutch 41 and the second one-way clutch 42 can be formed as a one-way clutch other than the roller type (for example, a sprag type). In other words, the first driving power transmitting members 41c or the second driving power transmitting members 42c may be the a sprag or a spherical member.

(19) In the embodiment described above, the configuration in which the distal end portion 35b of the pump drive shaft 35 is arranged inside the hole formed in the supporting portion 50 has been described as an example. However, the embodiment of the present invention is not limited thereto, and a configuration in which the supporting portion 50 does not have the hole for inserting the distal end portion 35b, and the pump drive shaft 35 is arranged in such a manner that the surface of the distal end portion 35b of the pump drive shaft 35 on the side of the first axial direction L1 is arranged so as to oppose the surface of the supporting portion 50 on the side of the second axial direction L2 in the axial direction is included as one of the preferred embodiments of the present invention. In the embodiment described above, the configuration in which the distal end portion 35b of the pump drive shaft 35 is formed to have a diameter smaller than the portion arranged in the pump cover 21 has been described as an example, however, the distal end portion 35b may be formed to have the same diameter as the portion to be arranged in the pump cover 21 or to have a diameter larger than the corresponding portion.

(20) In the embodiment described above, the configuration in which the second driving gear 52a is drive-coupled to the output shaft 94 so as to be rotated integrally therewith has been described as an example. However, the embodiment of the present invention is not limited thereto, and a configuration in which the second driving gear 52a is drive-coupled to the second rotor shaft 92 so as to be rotated integrally is also included as one of the preferred embodiments of the present invention. In this configuration, the second rotor shaft 92 functions as the second pump driving member 52.

(21) In the embodiment described above, the configuration in which the second pump driving member 52 is drive-coupled to both of the wheels 19 and the second dynamo-electric machine 12 without intermediary of the mechanism which can take the state of not transmitting the driving power has been described as an example. However, the embodiment of the present invention is not limited thereto, and a configuration in which the second pump driving member 52 is drive-coupled to at least one of the wheels 19 and the second dynamo-electric machine 12 via a mechanism which can assume a state of not transmitting the driving power thereto (for example, a mechanism including the clutch) is also applicable.

(22) In the embodiment described above, the configuration in which the first driving gear 51a is drive-coupled to the input shaft 90 so as to be rotated integrally therewith has been described as an example. However, the embodiment of the present invention is not limited thereto, and a configuration in which the first driving gear 51a is drive-coupled to the first rotor shaft 91 so as to be rotated integrally therewith is also possible. In this configuration, the first rotor shaft 91 functions as the first pump driving member 51, and the first pump driving member 51 is drive-coupled to the first dynamo-electric machine 11. In this configuration, the first dynamo-electric machine 11 and the second dynamo-electric machine 12 correspond to the "first driving power source" and the "second driving power source" in the present invention, respectively.

(23) In the embodiment described above, the case where the vehicle driving apparatus 2 is configured as so-called the hybrid driving apparatus of the two-motor split type having the first dynamo-electric machine 11 and the second dynamo-electric machine 12 as the driving power sources has been described as an example. However, the embodiment of the present invention is not limited thereto, and the present invention may be applied to a vehicle driving apparatus which uses one or both of the internal combustion engine or the single dynamo-electric machine as the driving power source (hybrid driving apparatus of a one-motor parallel type and the like). In this configuration, a configuration in which the first pump driving member 51 is driven by the internal combustion engine and the second pump driving member 52 is driven by the corresponding single dynamo-electric machine or the wheels is also applicable. It is also possible to apply the present invention to the driving apparatus for a vehicle (electric car or the like) having no internal combustion engine as the driving power source.

(24) The configurations of the drive transmission device 13, the transmission 15, and the like described in the embodiments described above are examples only, and all the configurations which can realize the configurations of the present invention with configurations other than those described above are included in the scope of the present invention. For example, the drive transmission device 13 or the transmission 15 may be configured as a double pinion-type planetary gear mechanism, or a differential gear mechanism having four or more rotating elements.

(25) In the embodiment described above, the case where the present invention is applied to the driving apparatus for a vehicle has been described as an example. However, the embodiment of the present invention is not limited thereto, and the present invention may be applied to all the driving apparatuses having a driving power transmission mechanism in the case. Also, in the embodiment described above, the configuration in which the hydraulic pressure generating apparatus is provided in the driving apparatus has been described as an example, the configuration in which the hydraulic pressure generating apparatus is provided in the apparatuses other than the driving apparatus is also applicable.

(26) In the embodiment described above, the case where the liquid pressure generating apparatus according to the present invention is the hydraulic pressure generating apparatus which generates the hydraulic pressure has been described as an example. However, the embodiment of the present invention is not limited thereto, and the present invention may be applied to liquid pressure generating apparatuses which generate, a liquid pressure to lubricant other than oil or liquid other than the lubricant.

(27) As regards other configurations, the embodiments disclosed in this specification are examples in every respects, and the embodiments of the present invention are not limited thereto. In other words, as long as the configurations described in Claims in the present application and configurations equivalent thereto are provided, the configurations in which part of the configurations which are not described in Claims is modified as needed also belong to the technical scope of the present invention as a matter of course.

The present invention can be applied preferably to a liquid pressure generating apparatus including a pump having a pump case and a pump drive shaft, two one-way clutches arranged coaxially with the pump drive shaft in a line in the axial direction on the side of a first axial direction, which is one side of the pump drive shaft, with respect to the pump case, and a driving apparatus having the corresponding liquid pressure generating apparatus.

What is claimed is:

1. A liquid pressure generating apparatus comprising: a pump having a pump case and a pump drive shaft; and two one-way clutches arranged coaxially with the pump drive shaft in a line in the axial direction on the side of a first axial direction, which is one side of the pump drive shaft, with respect to the pump case, wherein inner races of the respective two one-way clutches are integrated with each other and form a common inner race, outer races of the respective two one-way clutches are formed independently from each other and are driven respectively by pump driving members different from each other and, in addition, restricted directions of relative rotation with respect to the common inner race are identical to each other, the common inner race includes a coupling portion coupled to the pump drive shaft and extending in the radial direction and a cylindrical body portion extending from the coupling portion in a second axial direction opposite from the first axial direction on the radially outside the pump drive shaft, the body portion includes a depression indented radially outward on an inner peripheral surface thereof and a through hole communicating the depression with an outer peripheral surface of the body portion, and a lubricant supply portion for the depression is provided radially inside the depression.

2. The liquid pressure generating apparatus according to claim 1, further comprising:

a supporting portion for supporting the common inner race from the side of the first axial direction, wherein the pump case includes a projecting portion projecting from the corresponding pump case in the first axial direction, and radially supporting the corresponding pump drive shaft from radially outside the pump drive shaft so as to be capable of rotating relatively with respect to each other, a distal end portion of the projecting portion in the axial direction is arranged radially inside the body portion at a position overlapping with the depression or a position on the side of the first axial direction with respect to the depression when viewed in the radial direction, the pump drive shaft includes a surface extending in the direction intersecting the axial direction, and is provided with a pressure receiving portion configured to receive a liquid pressure in the first axial direction at the time of when the oil pump is driven, and a gap allowing lubricant to flow in the radial direction of the pump drive shaft is formed between the distal end portion of the projecting portion and the coupling portion in a state in which the common inner face receives a pressure by the pressure receiving portion and is supported by the supporting portion from the side of the first axial direction.

3. The liquid pressure generating apparatus according to claim 2, wherein the respective two one-way clutches include a drive power transmitting member configured to transmit a driving power selectively between the outer race and the inner race, the drive power transmitting member of the first one-way clutch, which is one of the two one-way clutches, is arranged in a first accommodating chamber provided in the common inner race, and the drive power transmitting member of the second one-way clutch, which is the other one of those, is arranged in a second accommodating chamber provided in the common inner race, and the common inner race includes a first communicating channel configured to communicate an opening of the through hole on the outer peripheral surface of the body portion with the first accommodating chamber, and a second communicating channel configured to communicate the opening of the through hole on the outer peripheral surface of the body portion with the second accommodating chamber.

4. The liquid pressure generating apparatus according to claim 3, wherein the body portion includes a cylindrical body portion outer peripheral surface, the first accommodating chamber and the second accommodating chamber communicate with a common through hole as the through hole common to each other, a common opening as an opening of the common through hole on the body portion outer peripheral surface is formed between the first accommodating chamber and the second accommodating chamber in the axial direction, and the first communicating channel and the second communicating channel are formed so as to extend from the common opening to the opposite sides from each other in the axial direction.

5. The liquid pressure generating apparatus according to claim 4, wherein the pump case includes a pump case inner flow channel communicating with a discharge port of the pump, the pump drive shaft includes a first flow channel communicating with the pump case inner flow channel via a passing portion and extending in the axial direction and a second flow channel communicating with the first flow channel, extending in the radial direction, opening through the outer peripheral surface of the corresponding pump drive shaft, and forming the supply portion, and the pump case inner flow channel, the passing portion, the first flow channel, and the second flow channel form a flow channel for supplying lubricant discharged from the pump to the depression.

6. The liquid pressure generating apparatus according to claim 5, comprising:

the supporting portion configured to support the common inner race from the side of the first axial direction and a thrust bearing arranged between the common inner race and the supporting portion for receiving an axial load, wherein the pump drive shaft further includes a third flow channel on the side of the first axial direction with respect to the second flow channel, the third flow channel communicating with the first flow channel, extending in the radial direction, and opening through the outer peripheral surface of the corresponding pump drive shaft and radially inside the thrust bearing, and the pump case inner flow channel, the passing portion, the first flow channel, and the third flow channel form a flow channel for supplying lubricant discharged from the pump to the thrust bearing.

7. A driving apparatus comprising:

the liquid pressure generating apparatus according to claim 6;

a first pump driving member drive-coupled to a driving power source; a second pump driving member drive-coupled to a wheel; and a drive transmission device configured to transmit a driving power selectively between the first pump driving member and the second pump driving member, wherein an outer race of the first one-way clutch, which is one of the two one-way clutches, is driven by the first pump driving member, and an outer race of the second one-way clutch, which is the other one of those, is driven by the second pump driving member.

8. A driving apparatus comprising: the liquid pressure generating apparatus according to claim 6, a first pump driving member drive-coupled to a first driving power source; a second pump driving member drive-coupled to a second driving power source, and a drive transmission device configured to transmit a driving power selectively between the first pump driving member and the second pump driving member, wherein an outer race of the first one-way clutch, which is one of the two one-way clutches, is driven by the first pump driving member, and an outer race of the second one-way clutch, which is the other one of those, is driven by the second pump driving member.

9. The driving apparatus according to claim 8, comprising: a first dynamo-electric machine and a second dynamo-electric machine as driving power sources, wherein
the drive transmission device includes a differential gear mechanism having at least three rotating elements including a first rotating element, a second rotating element, and a third rotating element,
the first dynamo-electric machine is drive-coupled to the first rotating element, an internal combustion engine is drive-coupled to the second rotating element, and the second dynamo-electric machine and a wheel are drive-coupled to the third rotating element, and
the first pump driving member is driven by the internal combustion engine, and the second pump driving member is driven by the wheel or the second dynamo-electric machine.

10. The liquid pressure generating apparatus according to claim 1, wherein
the respective two one-way clutches include a drive power transmitting member configured to transmit a driving power selectively between the outer race and the inner race,
the drive power transmitting member of the first one-way clutch, which is one of the two one-way clutches, is arranged in a first accommodating chamber provided in the common inner race, and the drive power transmitting member of the second one-way clutch, which is the other one of those, is arranged in a second accommodating chamber provided in the common inner race, and
the common inner race includes a first communicating channel configured to communicate an opening of the through hole on the outer peripheral surface of the body portion with the first accommodating chamber, and a second communicating channel configured to communicate the opening of the through hole on the outer peripheral surface of the body portion with the second accommodating chamber.

11. The liquid pressure generating apparatus according to claim 1, wherein
the pump case includes a pump case inner flow channel communicating with a discharge port of the pump,
the pump drive shaft includes a first flow channel communicating with the pump case inner flow channel via a passing portion and extending in the axial direction and a second flow channel communicating with the first flow channel, extending in the radial direction, opening through the outer peripheral surface of the corresponding pump drive shaft, and forming the supply portion, and
the pump case inner flow channel, the passing portion, the first flow channel, and the second flow channel form a flow channel for supplying lubricant discharged from the pump to the depression.

12. A driving apparatus comprising:
the liquid pressure generating apparatus according to claim 1;
a first pump driving member drive-coupled to a driving power source; a second pump driving member drive-coupled to a wheel; and a drive transmission device configured to transmit a driving power selectively between the first pump driving member and the second pump driving member, wherein
an outer race of the first one-way clutch, which is one of the two one-way clutches, is driven by the first pump driving member, and an outer race of the second one-way clutch, which is the other one of those, is driven by the second pump driving member.

13. A driving apparatus comprising: the liquid pressure generating apparatus according to claim 1, a first pump driving member drive-coupled to a first driving power source; a second pump driving member drive-coupled to a second driving power source, and a drive transmission device configured to transmit a driving power selectively between the first pump driving member and the second pump driving member, wherein
an outer race of the first one-way clutch, which is one of the two one-way clutches, is driven by the first pump driving member, and an outer race of the second one-way clutch, which is the other one of those, is driven by the second pump driving member.

14. The liquid pressure generating apparatus according to claim 2, wherein
the pump case includes a pump case inner flow channel communicating with a discharge port of the pump,
the pump drive shaft includes a first flow channel communicating with the pump case inner flow channel via a passing portion and extending in the axial direction and a second flow channel communicating with the first flow channel, extending in the radial direction, opening through the outer peripheral surface of the corresponding pump drive shaft, and forming the supply portion, and
the pump case inner flow channel, the passing portion, the first flow channel, and the second flow channel form a flow channel for supplying lubricant discharged from the pump to the depression.

15. The liquid pressure generating apparatus according to claim 14, comprising:
the supporting portion configured to support the common inner race from the side of the first axial direction and a thrust bearing arranged between the common inner race and the supporting portion for receiving an axial load, wherein
the pump drive shaft further includes a third flow channel on the side of the first axial direction with respect to the second flow channel, the third flow channel communicating with the first flow channel, extending in the radial direction, and opening through the outer peripheral surface of the corresponding pump drive shaft and radially inside the thrust bearing, and
the pump case inner flow channel, the passing portion, the first flow channel, and the third flow channel form a flow channel for supplying lubricant discharged from the pump to the thrust bearing.

16. A driving apparatus comprising:
the liquid pressure generating apparatus according to claim 15;
a first pump driving member drive-coupled to a driving power source; a second pump driving member drive-coupled to a wheel; and a drive transmission device configured to transmit a driving power selectively between the first pump driving member and the second pump driving member, wherein
an outer race of the first one-way clutch, which is one of the two one-way clutches, is driven by the first pump driving member, and an outer race of the second one-way clutch, which is the other one of those, is driven by the second pump driving member.

17. A driving apparatus comprising: the liquid pressure generating apparatus according to claim 15, a first pump driving member drive-coupled to a first driving power source; a second pump driving member drive-coupled to a second driving power source, and a drive transmission device configured to transmit a driving power selectively between the first pump driving member and the second pump driving member, wherein an outer race of the first one-way clutch, which is one of the two one-way clutches, is driven by the first pump driving member, and an outer race of the second one-way clutch, which is the other one of those, is driven by the second pump driving member.

18. The driving apparatus according to claim 17, comprising: a first dynamo-electric machine and a second dynamo-electric machine as driving power sources, wherein the drive transmission device includes a differential gear mechanism having at least three rotating elements including a first rotating element, a second rotating element, and a third rotating element, the first dynamo-electric machine is drive-coupled to the first rotating element, an internal combustion engine is drive-coupled to the second rotating element, and the second dynamo-electric machine and a wheel are drive-coupled to the third rotating element, and the first pump driving member is driven by the internal combustion engine, and the second pump driving member is driven by the wheel or the second dynamo-electric machine.

19. The liquid pressure generating apparatus according to claim 10, wherein the body portion includes a cylindrical body portion outer peripheral surface, the first accommodating chamber and the second accommodating chamber communicate with a common through hole as the through hole common to each other, a common opening as an opening of the common through hole on the body portion outer peripheral surface is formed between the first accommodating chamber and the second accommodating chamber in the axial direction, and the first communicating channel and the second communicating channel are formed so as to extend from the common opening to the opposite sides from each other in the axial direction.

20. The liquid pressure generating apparatus according to claim 19, wherein the pump case includes a pump case inner flow channel communicating with a discharge port of the pump, the pump drive shaft includes a first flow channel communicating with the pump case inner flow channel via a passing portion and extending in the axial direction and a second flow channel communicating with the first flow channel, extending in the radial direction, opening through the outer peripheral surface of the corresponding pump drive shaft, and forming the supply portion, and the pump case inner flow channel, the passing portion, the first flow channel, and the second flow channel form a flow channel for supplying lubricant discharged from the pump to the depression.

21. The liquid pressure generating apparatus according to claim 20, comprising:

the supporting portion configured to support the common inner race from the side of the first axial direction and a thrust bearing arranged between the common inner race and the supporting portion for receiving an axial load, wherein the pump drive shaft further includes a third flow channel on the side of the first axial direction with respect to the second flow channel, the third flow channel communicating with the first flow channel, extending in the radial direction, and opening through the outer peripheral surface of the corresponding pump drive shaft and radially inside the thrust bearing, and the pump case inner flow channel, the passing portion, the first flow channel, and the third flow channel form flow channel for supplying lubricant discharged from the pump to the thrust bearing.

22. A driving apparatus comprising:
the liquid pressure generating apparatus according to claim 21;
a first pump driving member drive-coupled to a driving power source; a second pump driving member drive-coupled to a wheel; and a drive transmission device configured to transmit a driving power selectively between the first pump driving member and the second pump driving member, wherein an outer race of the first one-way clutch, which is one of the two one-way clutches, is driven by the first pump driving member, and an outer race of the second one-way clutch, which is the other one of those, is driven by the second pump driving member.

23. A driving apparatus comprising: the liquid pressure generating apparatus according to claim 21, a first pump driving member drive-coupled to a first driving power source; a second pump driving member drive-coupled to a second driving power source, and a drive transmission device configured to transmit a driving power selectively between the first pump driving member and the second pump driving member, wherein an outer race of the first one-way clutch, which is one of the two one-way clutches, is driven by the first pump driving member, and an outer race of the second one-way clutch, which is the other one of those, is driven by the second pump driving member.

24. The driving apparatus according to claim 23, comprising: a first dynamo-electric machine and a second dynamo-electric machine as driving power sources, wherein the drive transmission device includes a differential gear mechanism having at least three rotating elements including a first rotating element, a second rotating element, and a third rotating element, the first dynamo-electric machine is drive-coupled to the first rotating element, an internal combustion engine is drive-coupled to the second rotating element, and the second dynamo-electric machine and a wheel are drive-coupled to the third rotating element, and the first pump driving member is driven by the internal combustion engine, and the second pump driving member is driven by the wheel or the second dynamo-electric machine.

* * * * *